US010459097B2

(12) United States Patent
Sollner

(10) Patent No.: US 10,459,097 B2
(45) Date of Patent: Oct. 29, 2019

(54) METHODS AND SYSTEMS FOR EXTRAPOLATING WAVEFIELDS

(71) Applicant: PGS Geophysical AS, Lysaker (NO)

(72) Inventor: Walter Sollner, Oslo (NO)

(73) Assignee: PGS Geophysical AS, Oslo (NO)

( * ) Notice: Subject to any disclaimer, the term of this patent is extended or adjusted under 35 U.S.C. 154(b) by 1121 days.

(21) Appl. No.: 13/680,287

(22) Filed: Nov. 19, 2012

(65) Prior Publication Data

US 2014/0140171 A1    May 22, 2014

(51) Int. Cl.
*G01V 1/30* (2006.01)
*G01V 1/38* (2006.01)
*G01V 1/36* (2006.01)

(52) U.S. Cl.
CPC .............. *G01V 1/303* (2013.01); *G01V 1/364* (2013.01); *G01V 1/38* (2013.01); *G01V 1/3808* (2013.01); *G01V 2210/6222* (2013.01)

(58) Field of Classification Search
CPC ........................................................ G01V 1/38
USPC .......................................................... 367/24
See application file for complete search history.

(56) References Cited

U.S. PATENT DOCUMENTS

| 7,646,672 B2 * | 1/2010 | Kluver ............................. 367/21 |
| 2004/0223411 A1 | 11/2004 | Vossen et al. |
| 2008/0089174 A1 * | 4/2008 | Sollner et al. ................... 367/21 |
| 2009/0003132 A1 | 1/2009 | Vassallo et al. |
| 2010/0091610 A1 | 4/2010 | Soellner |
| 2011/0242937 A1 * | 10/2011 | Sollner et al. ................... 367/38 |

OTHER PUBLICATIONS

Robertsson, Johan O.A., et al., "On the use of multicomponent streamer recordings for reconstruction of pressure wavefields in the crossline direction", Geophysics, vol. 73, No. 5, Sep.-Oct. 2008, pp. A45-A49.
Amundsen, Lasse et al., "Multicomponent ocean bottom and vertical cable seismic acquisition for wavefield reconstruction", Geophysics, vol. 75, No. 6, Nov.-Dec. 2010, pp. WB87-WB94.
Search Report issued in patent application No. 13192707.1 and from the European Patent Office, dated Mar. 25, 2014, 8 pages.

* cited by examiner

*Primary Examiner* — Jack W Keith
*Assistant Examiner* — John T Nolan

(57) ABSTRACT

Methods and Systems for extrapolating wavefields while avoiding disruptions due to spatial aliasing are disclosed. Pressure wavefields measured with pressure sensors and vertical and horizontal velocity wavefields measured with three-axial motions sensors may be spatially aliased in at least one horizontal direction. The pressure wavefield and/or the vertical velocity wavefield are decomposed into one of an up-going wavefield and a down-going wavefield. The up-going or down-going wavefield is extrapolated using an extrapolator that depends on components of a slowness vector. In order to avoid disruptions in the extrapolated wavefield due to spatial aliasing, the components of the slowness vector are calculated from the measured pressure wavefield and the two horizontal velocity wavefields.

25 Claims, 24 Drawing Sheets

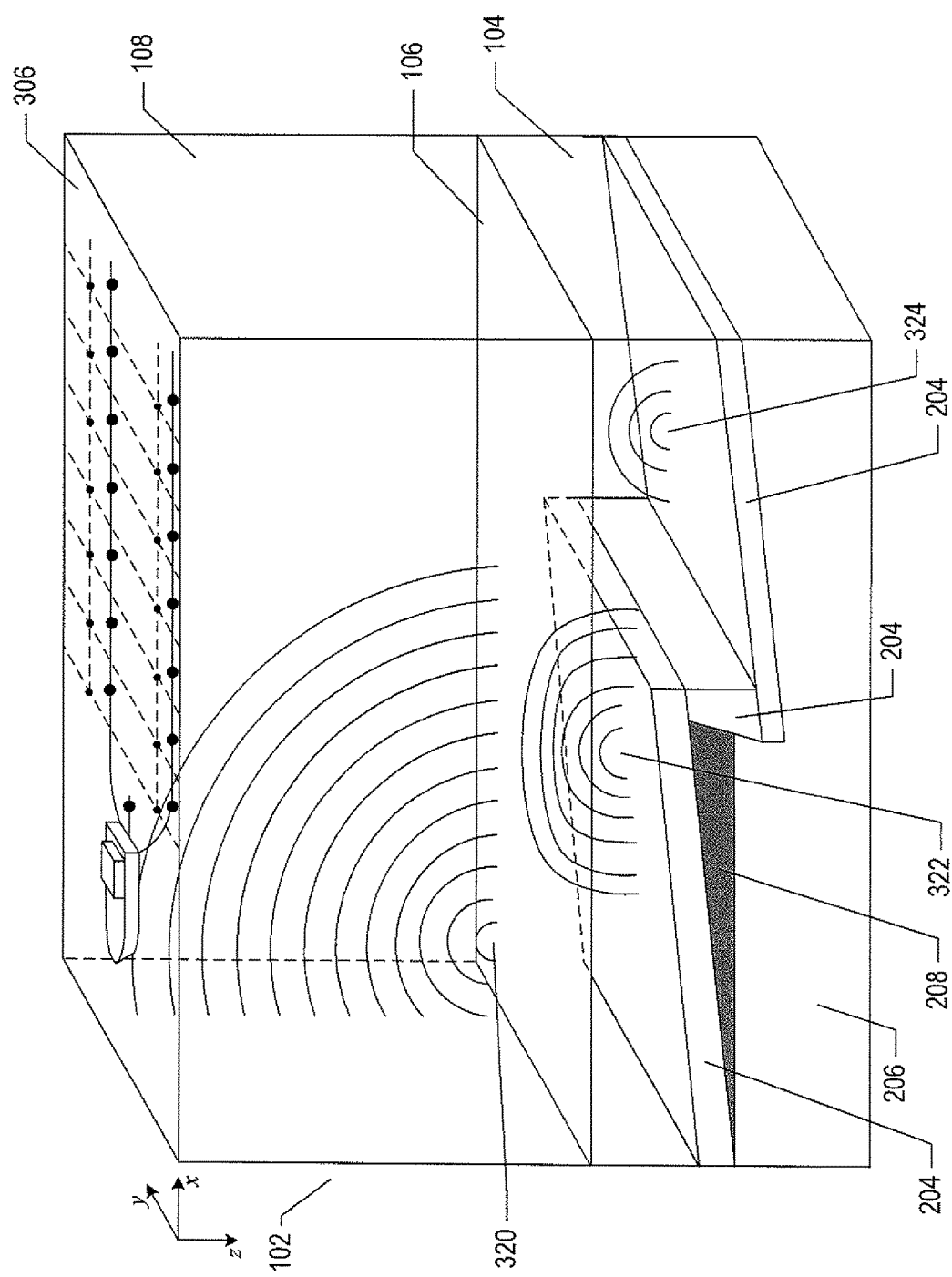

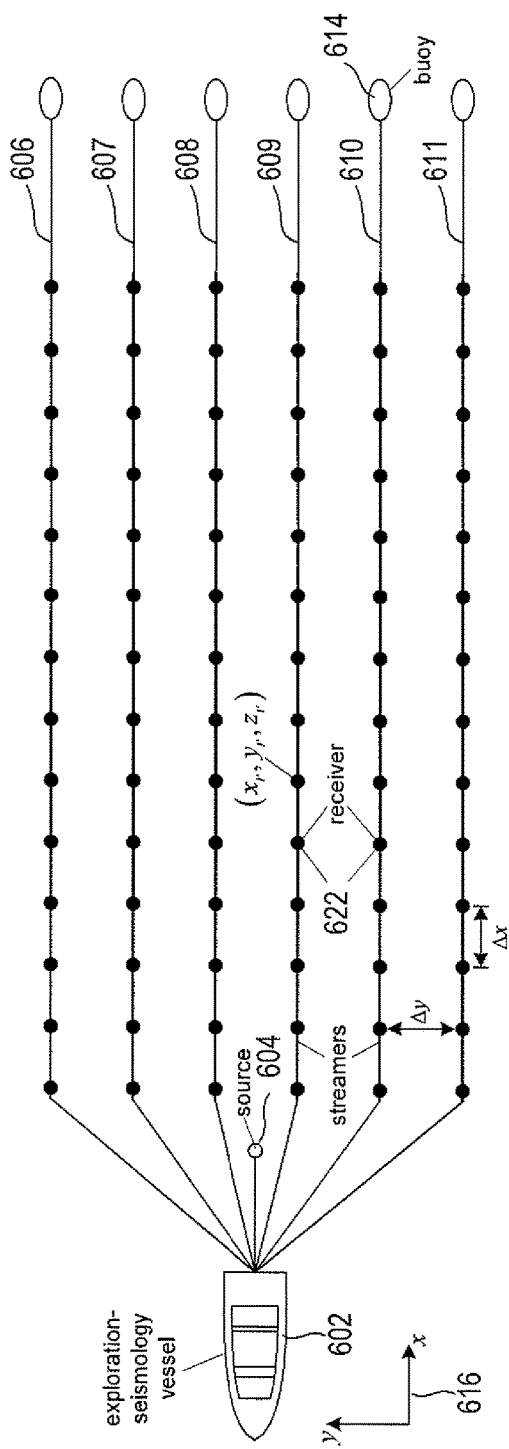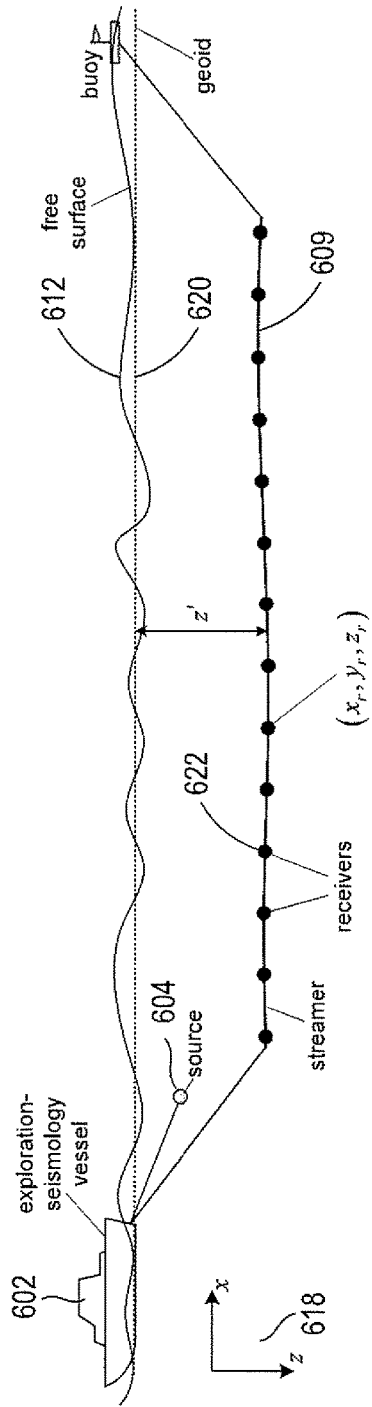
FIG. 6A
FIG. 6B

METHODS AND SYSTEMS FOR EXTRAPOLATING WAVEFIELDS

BACKGROUND

In the past few decades, the petroleum industry has invested heavily in the development of marine seismic survey techniques that yield knowledge of subterranean formations located beneath a body of water in order to find and extract valuable mineral resources, such as oil. High-resolution seismic images of a subterranean formation are essential for quantitative interpretation and improved reservoir monitoring. Some marine seismic surveys are carried out with an exploration-seismology vessel that tows a seismic source and one or more streamers that form a seismic data acquisition surface below the surface of the water and over a subterranean formation to be surveyed for mineral deposits. Other marine seismic surveys can be carried out with ocean bottoms cables ("OBCs") that lie on or just above the sea floor. The OBCs are connected to an anchored exploration-seismology vessel that may include a seismic source. A typical exploration-seismology vessel contains seismic acquisition equipment, such as navigation control, seismic source control, seismic receiver control, and recording equipment. The seismic source control causes the seismic source to produce acoustic impulses at selected times. Each impulse is a sound wave that travels down through the water and into the subterranean formation. At each interface between different types of rock, a portion of the sound wave is transmitted, and another portion is reflected back toward the body of water. The streamers and OBCs include a number of seismic receivers or sensors that detect pressure and/or velocity wavefields associated with the sound waves reflected back into the water from the subterranean formation. The pressure and velocity wavefield data is processed to generate images of the subterranean formation.

However, when the receivers are separated by more than half the reflected wavefield wavelengths, the recorded wavefield is spatially aliased. For example, in towed streamer acquisition, the streamers are typically separated by distances that often result in spatially aliased recorded wavefields. As a result, images of a subterranean formation along directions perpendicular to the streamers are not reliable. Those working in the petroleum industry continue to seek systems and methods that can be used to process pressure and velocity wavefield data to avoid the spatially aliased aspect of the recorded wavefield.

DESCRIPTION OF THE DRAWINGS

FIGS. 3A-3C show an example of exploration-seismology carried out with towed streamers.

FIGS. 6A-6B show top and side-elevation views, respectively, of an exploration-seismology vessel towing a source and streamers.

DETAILED DESCRIPTION

Methods and systems for extrapolating wavefields while avoiding disruptions due to spatial aliasing are disclosed. Pressure wavefields measured with pressure sensors and vertical and horizontal velocity wavefields measured with three-axial motions sensors may be spatially aliased in at least one horizontal direction. Methods and systems described below are directed to decomposing the pressure wavefield and/or the vertical velocity wavefield into either an up-going wavefield or a down-going wavefield and extrapolated the wavefields using an extrapolator that depends on components of a slowness vector. In one aspect of the methods and systems described below, the components of the slowness vector are calculated from the measured pressure wavefield and two horizontal velocity wavefields, which avoids spatial aliasing disruptions in the extrapolated wavefield.

Figure 1:
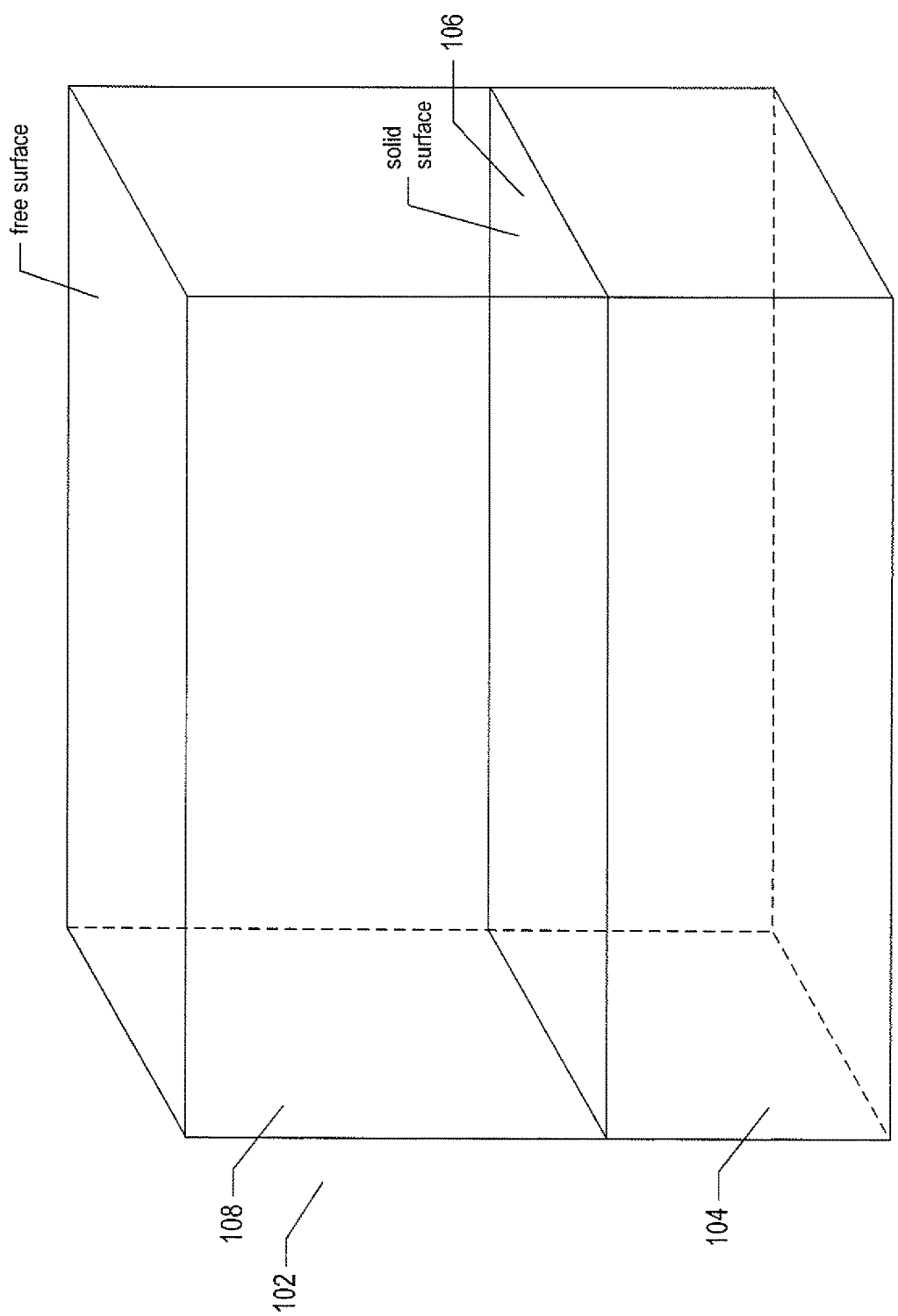
FIG. 1 shows a domain volume of the earth's surface.

FIG. 1 shows a domain volume of the earth's surface. The domain volume 102 comprises a solid volume of sediment and rock 104 below the solid surface 106 of the earth that, in turn, underlies a fluid volume of water 108 within an ocean, an inlet or bay, or a large freshwater lake. The domain volume 102 represents an example experimental domain for a class of exploration-seismology observational and analytical techniques and systems referred to as "marine exploration seismology."

Figure 2:
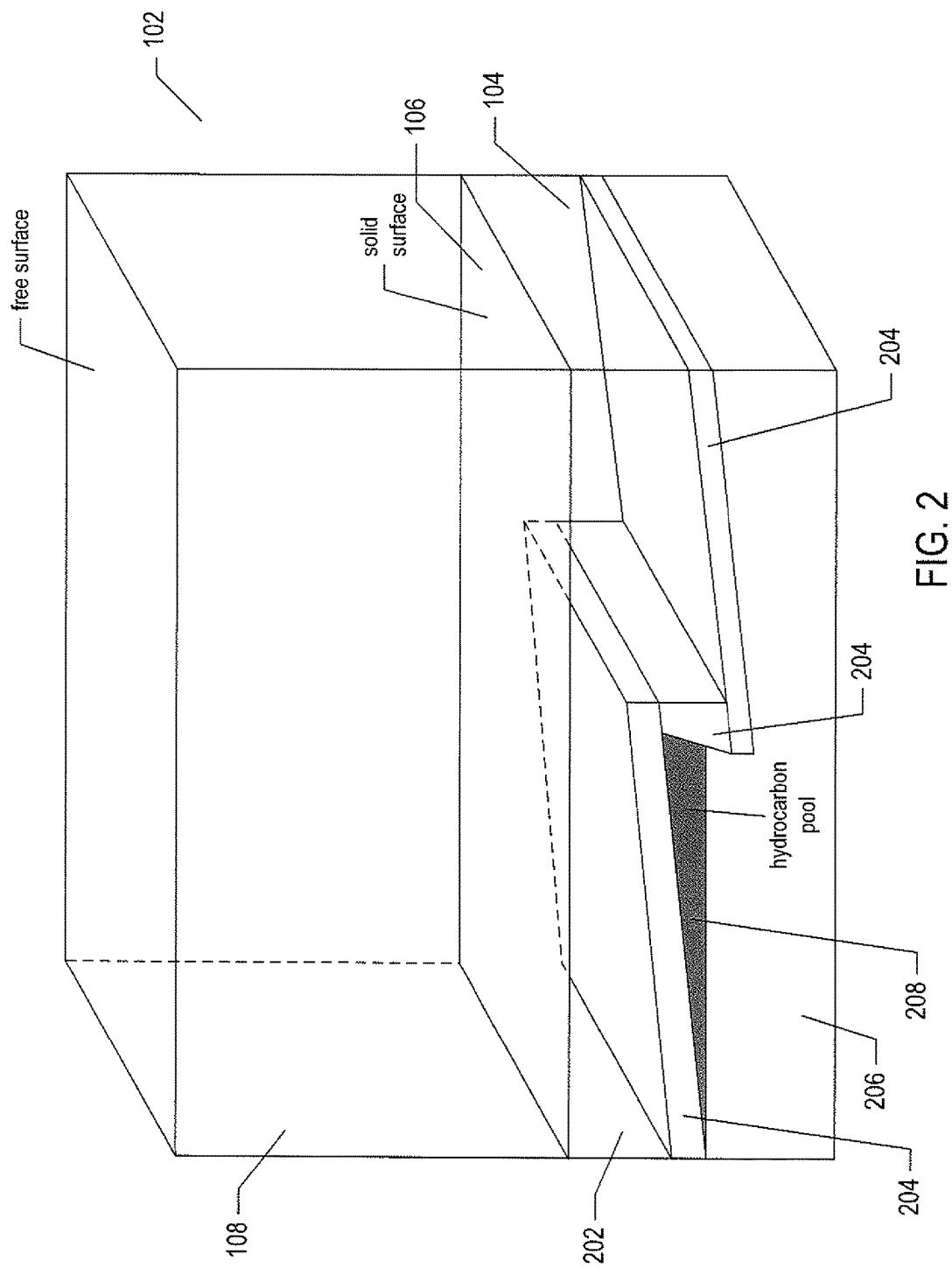
FIG. 2 shows subsurface features of a subterranean formation in the lower portion of the domain volume shown in FIG. 1.

FIG. 2 shows subsurface features of a subterranean formation in the lower portion of the domain volume 102 shown in FIG. 1. As shown in FIG. 2, for exploration-seismology purposes, the fluid volume 108 is a relatively featureless, generally homogeneous volume overlying the solid volume 104 of interest. However, while the fluid volume 108 can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume 108, the solid volume 104 is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer 204. In certain cases, the second rock layer 206 may be porous and contain a significant concentration of liquid hydrocarbon 208 that is less dense than the second-rock-layer material and that therefore rises upward within the second rock layer 206. In the case shown in FIG. 2, the first rock layer 204 is not porous, and therefore forms a lid that prevents further upward migration of the liquid hydrocarbon, which therefore pools in a hydrocarbon-saturated layer 208 below the first rock layer 204. One goal of exploration seismology is to identify the locations of hydrocarbon-saturated porous strata within volumes of the earth's crust underlying the solid surface of the earth.

Figure 3A:
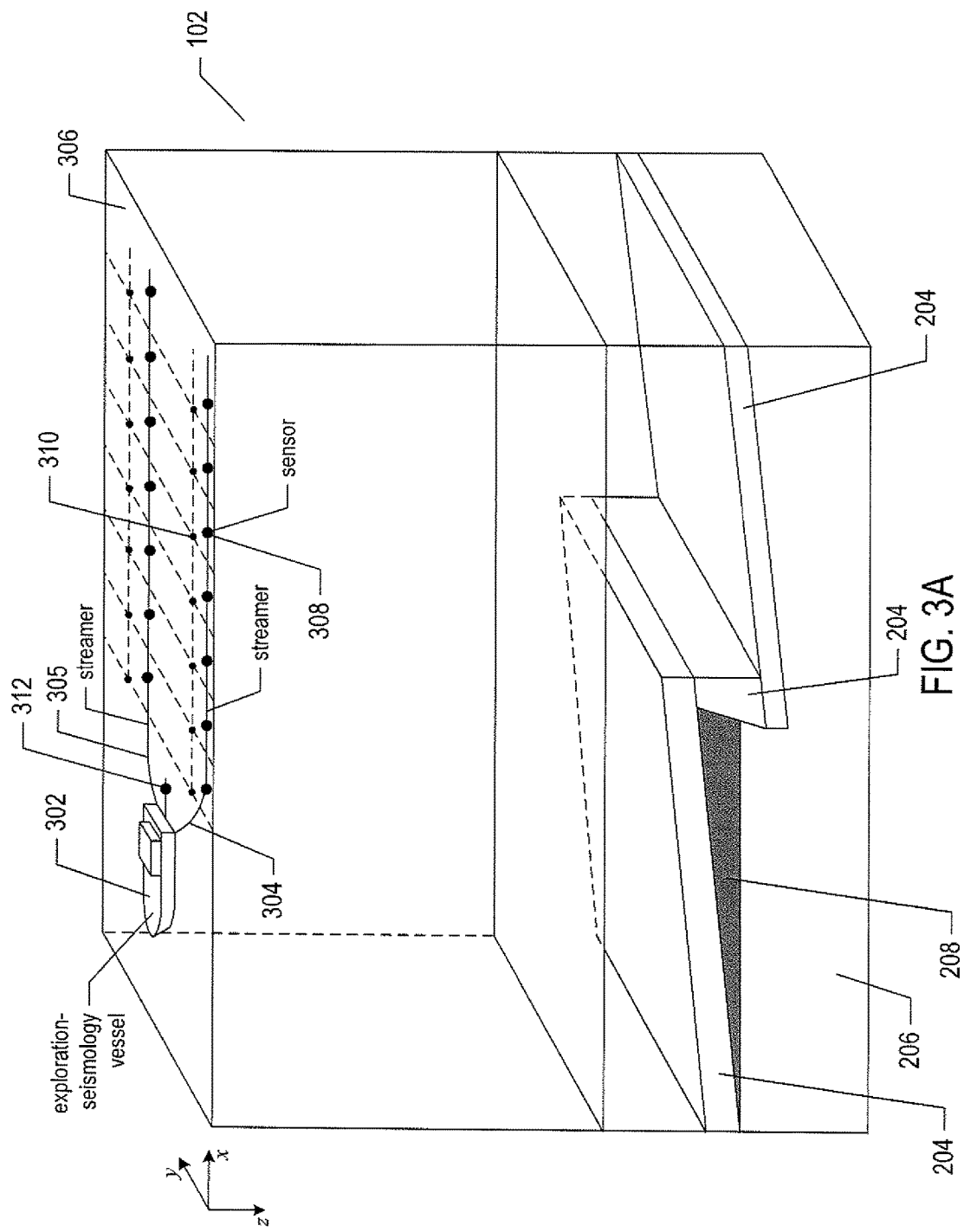
Figure 3B:
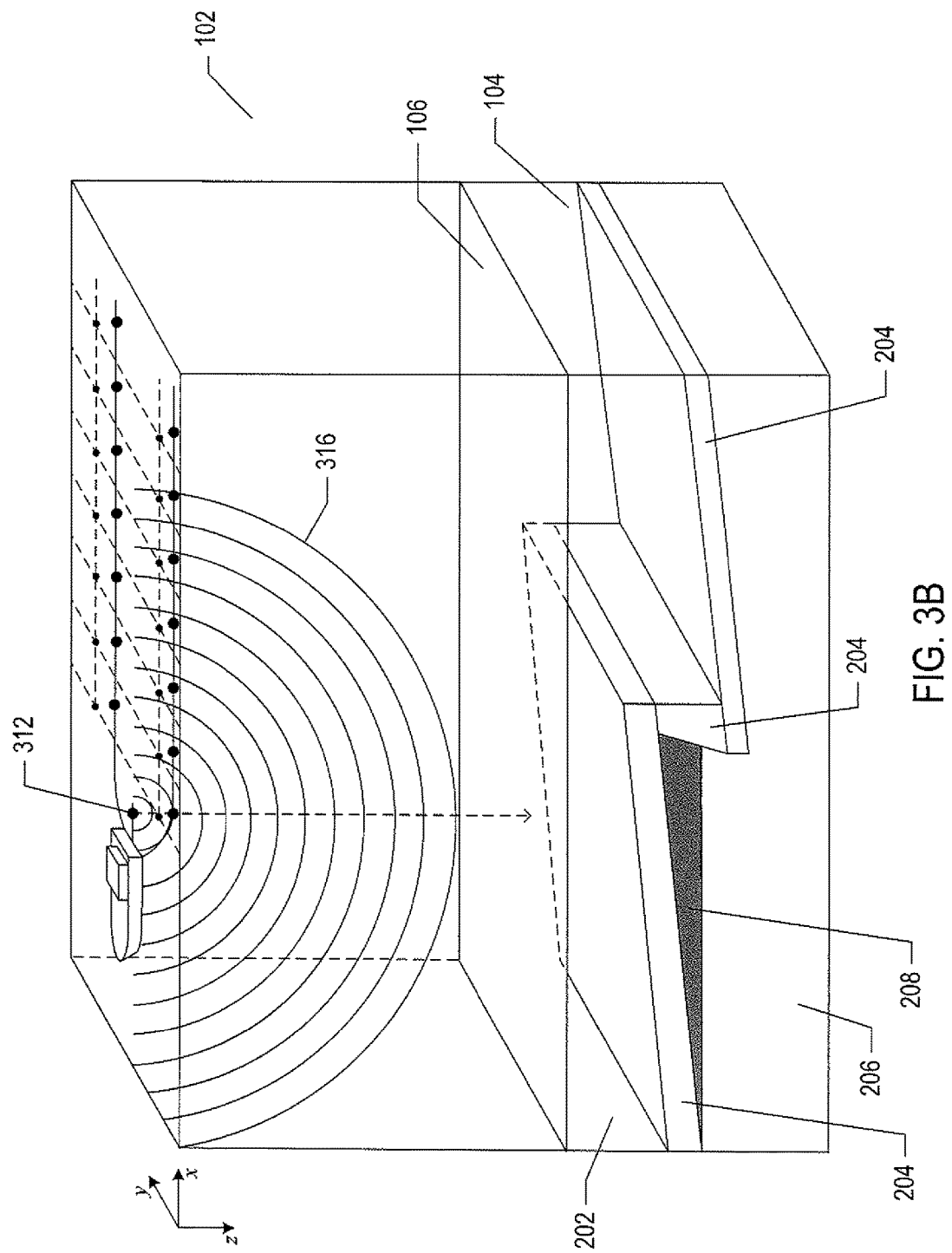

FIGS. 3A-3C show an exploration-seismology method by which digitally encoded data is instrumentally acquired for subsequent exploration-seismology processing and analysis in order to characterize the structures and distributions of features and materials of a subterranean formation. FIG. 3A shows an example of an exploration-seismology vessel 302 equipped to carry out a series of exploration-seismology data collections. In particular, the vessel 302 tows one or more streamers 304-305 across an approximately constant-depth plane generally located a number of meters below the free surface 306. The streamers 304-305 are long cables containing power and data-transmission lines to which receivers, also referred to as "sensors," are connected at spaced-apart locations. In one type of exploration seismology, each receiver, such as the receiver represented by the shaded disk 308 in FIG. 3A, comprises a pair of seismic receivers including a geophone that detects vertical displacement within the fluid medium over time by detecting particle motion, velocities or accelerations, and a hydrophone that detects variations in pressure over time. The streamers 304-305 and the vessel 302 include sophisticated sensing electronics and data-processing facilities that allow receiver readings to be correlated with absolute positions on the free surface and absolute three-dimensional positions with respect to an arbitrary three-dimensional coordinate system. In FIG. 3A, the receivers along the streamers are shown to lie below the free surface 306, with the receiver positions correlated with overlying surface positions, such as a surface position 310 correlated with the position of receiver 308. The vessel 302 also tows one or more acoustic-wave sources 312 that produce pressure impulses at spatial and temporal intervals as the vessel 302 and towed streamers 304-305 move across the free surface 306. In other embodiments, the one or more acoustic-wave sources 312 may be towed by a separate vessel. Although FIG. 3A illustrates use of two streamers 304-305, other embodiments might include additional streamers, including up to as many as 20 or more streamers towed by exploration-seismology vessel 302. In still other embodiments, at least one of the streamers may be towed at a different depth than streamers 304-305, and one or more of the streamers may be towed with a depth profile that is at an angle to free surface 306.

FIG. 3B shows an expanding, acoustic wavefront, represented by semicircles of increasing radius centered at the acoustic source 312, such as semicircle 316, following an acoustic pulse emitted by the acoustic source 312. The wavefronts are, in effect, shown in vertical plane cross section in FIG. 3B. As shown in FIG. 3C, the outward and downward expanding acoustic wavefield, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, the propagation of which can be modeled by the acoustic-wave equation while, in a solid volume, the waves include both P-waves and transverse waves, or S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate upward toward receivers in response to the pressure impulse emitted by the acoustic source 312 and downward-propagating elastic waves generated from the pressure impulse.

As shown in FIG. 3C, secondary waves of significant amplitude are generally emitted from points on or close to the solid surface 106, such as point 320, and from points on or very close to a discontinuity in the solid volume 104, such as points 322 and 324. Tertiary waves may be emitted from the free surface 306 back towards the solid surface 106 in response to secondary waves emitted from the solid surface and subsurface features.

FIG. 3C also shows the fact that secondary waves are generally emitted at different times within a range of times following the initial pressure impulse. A point on the solid surface 106, such as point 320, receives a pressure disturbance corresponding to the initial pressure impulse more quickly than a point within the solid volume 104, such as points 322 and 324. Similarly, a point on the solid surface directly underlying the acoustic source receives the pressure impulse sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial pressure impulse and secondary waves emitted in response to the initial pressure impulse are complex functions of distance from the acoustic source as well as the materials and physical characteristics of the materials through which the acoustic wave corresponding to the initial pressure impulse travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition of waves emitted from within the domain volume 102 in response to the initial pressure impulse is a generally very complicated wavefield that includes information about the shapes, sizes, and material characteristics of the domain volume 102, including information about the shapes, sizes, and locations of the various reflecting features within the subterranean formation of interest to exploration seismologists.

Figure 4A:
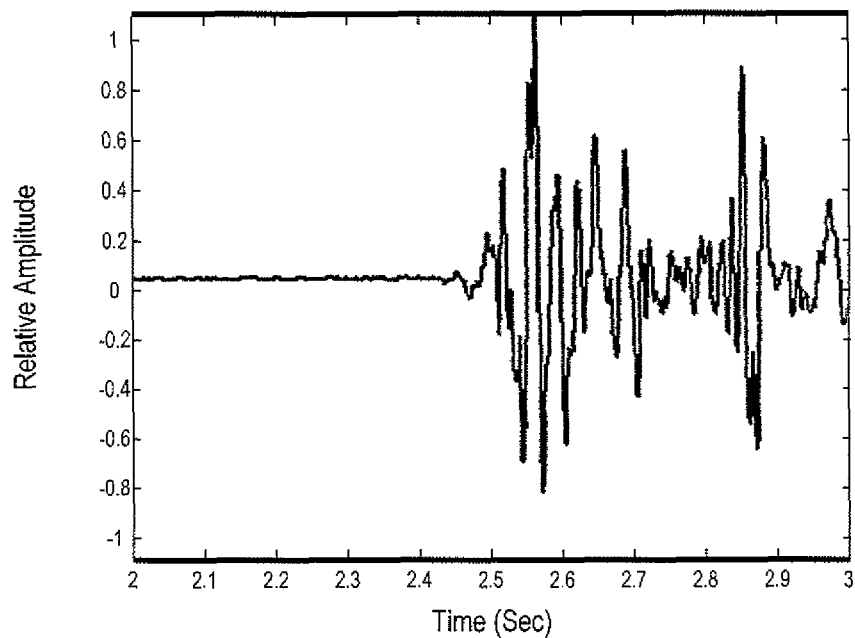
FIGS. 4A-4B show processed waveforms generated from hydrophone and geophone outputs, respectively.
Figure 4B:
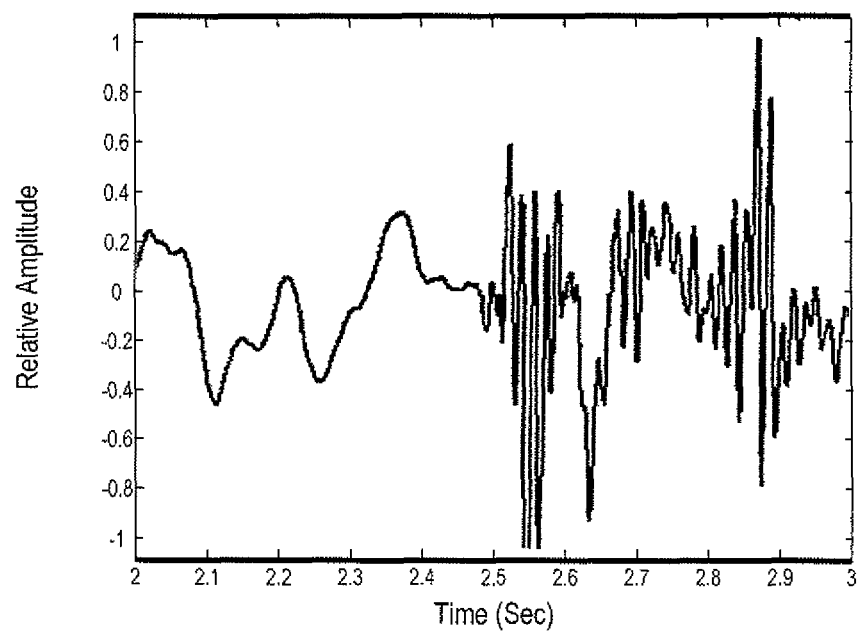

The complicated wavefield that results from the initial pressure impulse is sampled, over time, by the sensors positioned along the streamers towed by an exploration-seismology vessel. FIGS. 4A-4B show processed waveforms generated from hydrophone and geophone outputs, respectively. As shown in FIG. 4A, the waveform recorded by the hydrophone represents the pressure at times following the initial pressure impulse, with the amplitude of the waveform at a point in time related to the pressure wavefield at the hydrophone at the point in time. Similarly, as shown in FIG. 4B, the geophone provides an indication of the fluid particle velocity or acceleration, in a vertical direction, related to the pressure wavefield at the geophone at the point in time.

Figure 5:
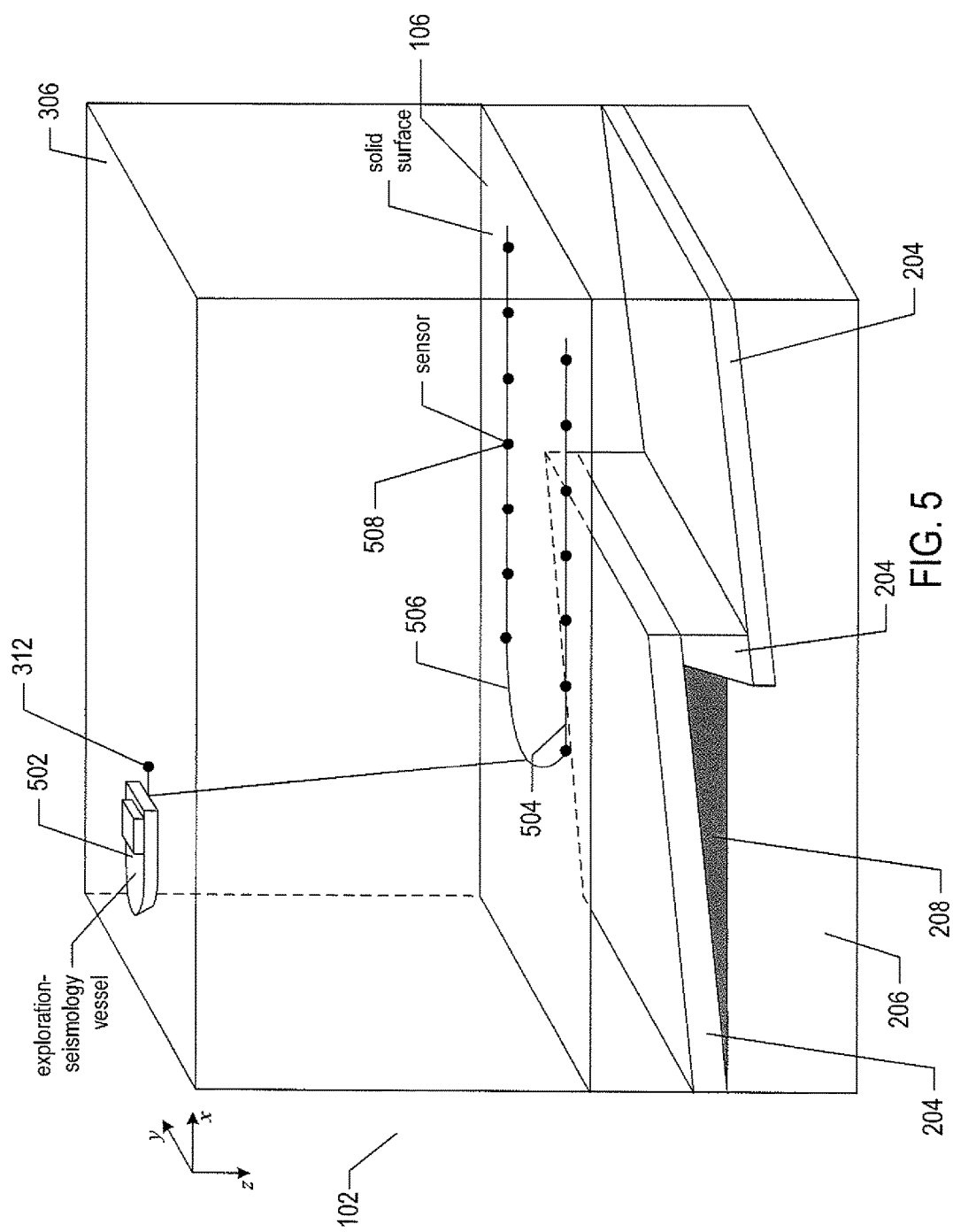
FIG. 5 shows an example of exploration seismology carried out with ocean bottom cables.

Subterranean formations located beneath a volume of water can also be investigated using ocean bottom seismic techniques. One example of these techniques is implemented with ocean bottom cables ("OBCs"). FIG. 5 shows an example of an exploration-seismology vessel 502 equipped with two OBCs 504 and 506. The OBCs are similar to the towed streamer cables described above in that the OBCs include a number of spaced-apart receivers 508, such as receivers deployed approximately every 25 to 50 meters, but the OBCs are laid on the solid surface 106. The OBCs are electronically connected to the anchored recording vessel 502 that provides power, instrument command and control, and data telemetry of the sensor data to the recording equipment on board the vessel. Alternatively, ocean bottom seismic techniques can be implemented with autonomous systems composed of receiver nodes that are deployed and recovered using remote operated vehicles. The receiver nodes are typically placed on the sea floor in a fairly coarse grid, such as approximately 400 meters apart. Autonomous receiver systems are typically implemented using one of two types of receiver node systems. A first receiver node system is a cable system in which the receiver nodes are connected by cables to each other and are connected to an anchored recording vessel. The cabled systems have power supplied to each receiver node along a cable and seismic data is returned to the recording vessel along the cable or using radio telemetry. A second receiver node system uses self-contained receiver nodes that have a limited power supply, but the receiver nodes typically have to be retrieved in order to download recorded seismic data. Whether using OBCs or autonomous receiver nodes, a separate source vessel equipped with at least one seismic source can be used to generate pressure impulses at spatial and temporal intervals as the source vessel moves across the free surface.

Receiver Acquisition Surfaces

FIGS. 6A-6B show top and side-elevation views, respectively, of an exploration-seismology vessel 602 towing a source 604, and six separate streamers 606-611 located beneath a free surface 612. Each streamer is attached at one end to the vessel 602 and at the opposite end to a buoy, such as buoy 614 attached to the steamer 610. The streamers 606-611 form an essentially planar horizontal receiver acquisition surface located beneath the free surface 612. However, in practice, the receiver acquisition surface is smoothly varying due to active sea currents and weather conditions. In other words, the towed streamers may undulate as a result of dynamic conditions of the fluid. FIG. 6B represents a snapshot, at an instant in time, of the free surface 612 and corresponding smooth wave-like shape in the streamer 609. The source 604 can be implemented as an array of seismic source elements, such as air guns and/or water guns, in order to amplify sound waves and overcome undesirable aspects of a signature associated with using a single source element. In some embodiments, the source 604 may be towed by a separate vessel. Although FIG. 6 illustrates use of six streamers 606-611, other embodiments might include additional streamers, including up to as many as 20 or more streamers towed by exploration-seismology vessel 602. In still other embodiments, at least one of the streamers may be towed at a different depth than streamers 606-611, and one or more of the streamers may be towed with a depth profile that is an essentially planar horizontal acquisition surface at an angle to free surface 612.

FIGS. 6A and 6B include an xy-plane 616 and an xz-plane 618 of the same Cartesian coordinate system used to specify orientations and coordinate locations within the fluid volume. The x coordinate uniquely specifies the position of a point in a direction parallel to the length of the streamers, and the y coordinate uniquely specifies the position of a point in a direction perpendicular to the x axis and substantially parallel to the free surface 612. The x-direction is referred to as the "inline" direction, and the y-direction is referred to as the "crossline" direction. The z coordinate uniquely specifies the position of a point perpendicular to the xy-plane with the positive z-direction pointing downward away from the free surface 612. As shown in FIG. 6B, the streamer 609 is at a depth, z', below the free surface 612, which can be estimated at various locations along the streamers from depth measuring devices (not shown) attached to the streamers. For example, depth measuring devices may measure hydrostatic pressure or utilize acoustic distance measurements. The depth measuring devices may be integrated with depth controllers, such as paravanes or water kites. The depth measuring devices are typically placed at about 300 meter intervals along each streamer. The estimated streamer depths are then used to calculate a two-dimensional interpolated streamer shape that approximates the wave-like shape of an actual streamer at an instant in time. Alternatively, the estimated streamer depths can be used to calculate a three-dimensional interpolated surface approximation of the acquisition surface. The depth and the elevation of the free-surface profile are estimated with respect to the geoid, which is represented in FIG. 6B by dotted line 620. The geoid is the hypothetical surface of the earth that coincides everywhere with mean sea level and can be used to define zero elevation (i.e., z=0). In FIGS. 6A and 6B, shaded disks, such as shaded disk 622, represent receivers spaced apart along each streamer. The coordinates of the receivers are denoted by $(x_r, y_r, z_r)$, where the depth $z_r$ can be an interpolated value.

Figure 7:
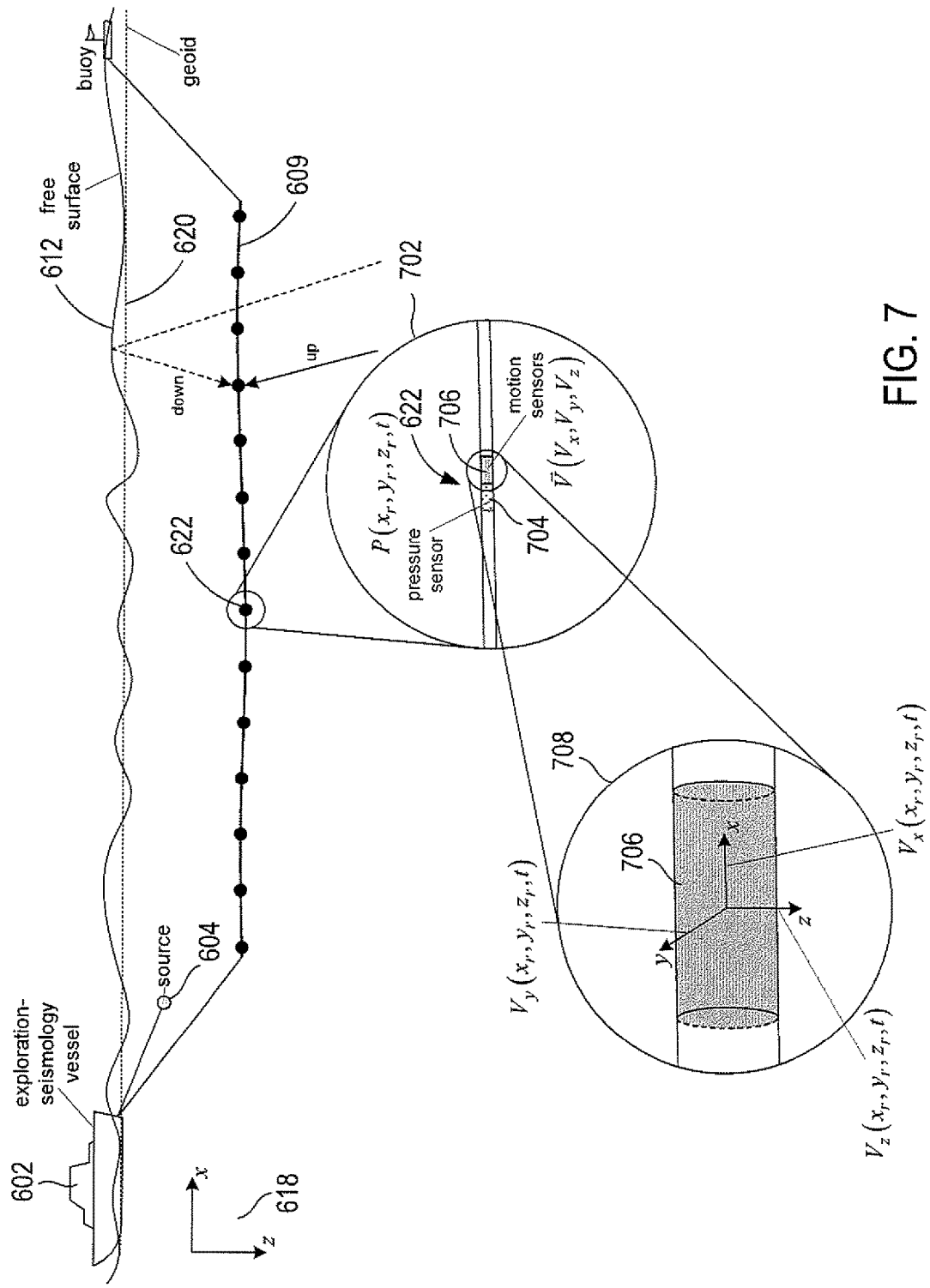
FIG. 7 shows a side view of a streamer located beneath a free surface.

FIG. 7 shows a side or xz-plane view of the streamer 609 located beneath the free surface 612. Each receiver 622 includes a pressure sensor and three motion sensors. For example, FIG. 7 includes a magnified view 702 of the receiver 622 that includes a pressure sensor 704 and motion sensors 706. The pressure sensors can be hydrophones that measure the pressure wavefield, and the motion sensors can be particle velocity sensors, also called geophones, or particle acceleration sensors, called accelerometers. Each pressure sensor measures the total pressure wavefield, denoted by $P(x_r, y_r, z_r, t)$, in all directions, while the motion sensors of each receiver measure velocity wavefield components of a velocity wavefield vector, denoted by $\vec{V}(V_x, V_y, V_z)$, where $V_x(x_r, y_r, z_r, t)$, $V_y(x_r, y_r, z_r, t)$, and $V_z(x_r, y_r, z_r, t)$ are measured velocity wavefields in the x-, y-, and z-directions, respectively, as represented in magnified view 708.

Figure 8:
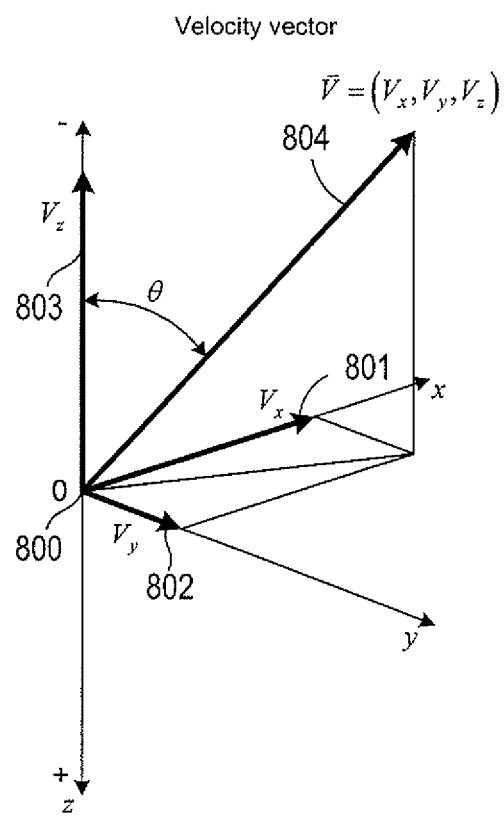
FIG. 8 shows a Cartesian coordinate system associated with an example vector wavefield.

FIG. 8 shows a Cartesian coordinate system with the origin 800 centered at three motion sensors (not shown) of a receiver. The velocity wavefield components $V_x(x_r, y_r, z_r, t)$ 801, $V_y(x_r, y_r, z_r, t)$ 802, and $V_z(x_r, r, z_r, t)$ 803 are directed along x-, y-, and z-coordinate axes, respectively. The motion sensors of each receiver are unidirectional in that each motion sensor only measures one directional component of the velocity wavefield vector $\vec{V}$ 804 that points in the direction the wavefield propagates. The vertical velocity component, $V_z$, also called the vertical velocity wavefield, of the total wavefield is equal to the total wavefield $\vec{V}$ only for wavefields that propagate vertically. In other words, as shown in FIG. 8, θ is the angle of incidence between the direction of the total wavefield and the motion sensor orientation. When the wavefield propagates vertically upward, θ=0, by convention, and the total velocity wavefield is the vertical velocity wavefield (i.e., $\vec{V}=-V_z$), and when the wavefield propagates vertically downward, θ=180° and the total velocity wavefield is the vertical velocity wavefield (i.e., $\vec{V}=+V_z$).

The OBCs and autonomous receiver nodes used in ocean bottom seismic technique also form a receiver acquisition surface. The receivers used in ocean bottom seismic techniques can also be implemented with pressure sensors and three motion sensors that measure particle motion in three dimensions, as described above. In particular, each receiver of an OBC or an autonomous receiver node can be implemented with a pressure sensor that measures the total pressure wavefield $P(x_r, y_r, z_r, t)$ and includes three motion sensors that measure velocity wavefield components $V_x(x_r, y_r, z_r, t)$, $V_y(x_r, y_r, z_r, t)$, and $V_z(x_r, y_r, z_r, t)$ in the x-, y-, and z-directions, respectively.

Spatial Aliasing

The receiver acquisition surface spatially samples the wavefield with the receivers separated by a distance Δx in the in-line or x-direction and by a distance Δy in the cross-line or y-direction, as shown in FIG. 6A. However, large receiver separation can result in a spatially aliased recorded wavefield. For example, in towed streamer acquisition, the streamers are typically manufactured with the receiver separation distance short enough to avoid aliasing in the inline direction, but when the data acquisition surface is deployed, the streamers are typically separated in the cross-line direction by approximately 50 to 100 meters, which often results in the recorded wavefield being aliased in the cross-line direction.

Figure 9A:
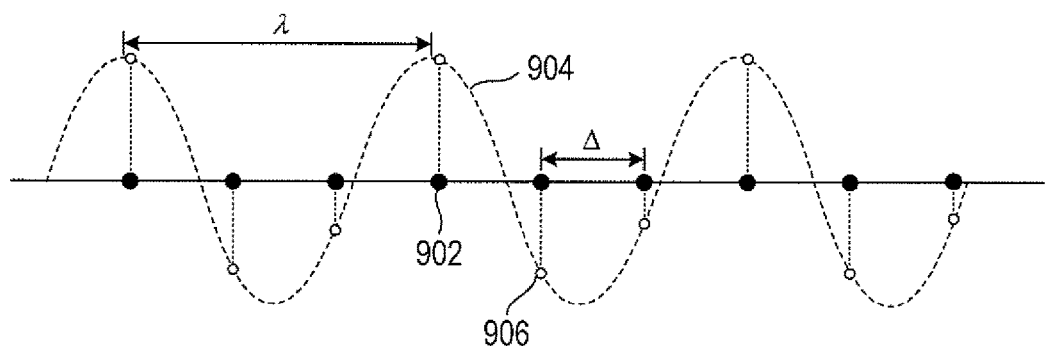
FIGS. 9A-9B show an example of spatial aliasing using sinusoidal wave representations.
Figure 9B:
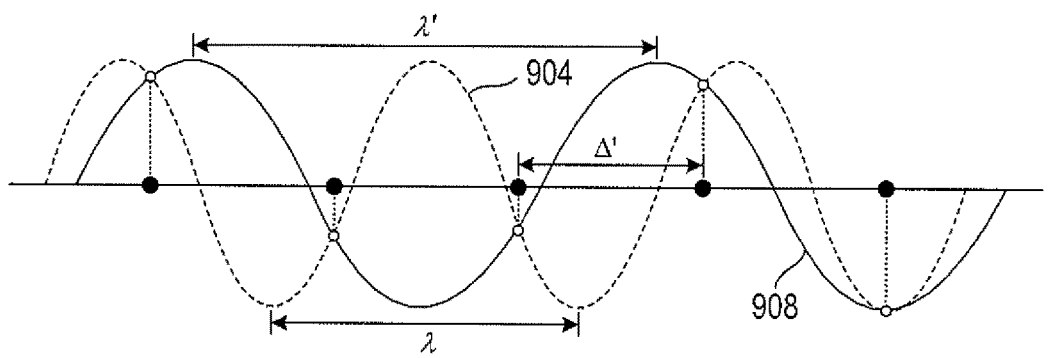

FIGS. 9A-9B show an example of aliasing using sinusoidal wave representations of waves recorded along two different lines of receives at a given instance of time. In FIG. 9A-9B, solid circles, such as solid circle 902, represent receivers and a sinusoid dashed-line curve 904 represents a wave, such as a pressure wave or a velocity wave, at an instant in time. Open circles, such as open circle 906, represent the amplitude of the wave 904 recorded by the receivers at the instant of time. In FIG. 9A, the receivers are separated by a distance Δ, and in FIG. 9B, the receives are separated by a larger distance Δ' (i.e., Δ'>Δ). In FIG. 9A, the receivers are spaced close enough to avoid spatial aliasing, because with the receivers separated by the distance Δ, the wave 904 can be reconstructed from the amplitudes recorded by the receivers. By contrast, in FIG. 9B, the receivers are spaced so that spatial aliasing cannot be avoided. Solid-line curve 908 represents a curve that is hypothetically reconstructed from the recorded amplitudes measured by the receivers. Because the receivers are spaced far apart, the reconstructed wave 908 has a much larger wavelength λ' than the actual wavelength λ of the original wave 904. Thus, the receivers of FIG. 9B cannot be used to reliably reconstruct the original wave 904.

The Nyquist wavelength, $\lambda_N$, is the shortest spatial wavelength that can be accurately recovered by sequential observations along a line of receivers with spacing Δ and is related to the receiver spacing Δ by:

$$\lambda_N = 2\Delta \tag{1}$$

Wavelengths that are shorter than the Nyquist wavelength $\lambda_N$ do appear in the measured results, but these wavelengths are aliased into waves with longer wavelengths, as described above with reference to FIG. 9, which wrongly suggests that the wave contains more power than actually exists in certain frequency ranges.

In spatial sampling, the receiver spacing Δ is also related to the Nyquist wavenumber, $k_N$, as follows:

$$\frac{k_N}{2\pi} = \frac{1}{\lambda_N} = \frac{1}{2\Delta} \tag{2}$$

The Nyquist wavenumber corresponds to the maximum number of cycles per meter that can be accurately recovered by sequential observation. Spatial aliasing occurs when a wave has more cycles per meter than $k_N$. In other words, spatial aliasing occurs when the wavenumber k associated with a wavefield is greater than the Nyquist wavenumber $k_N$ (i.e., $k>k_N$ or $\lambda<\lambda_N$). Receiver spacing Δ that is less than $\lambda_N/2$ ensures that the actual wavefield can be reconstructed from the measured wavefield.

Decomposing Pressure and Vertical Velocity Wavefields into Up-Going and Down-Going Wavefields The pressure wavefield P and the vertical velocity wavefield $V_z$ can be decomposed into an up-going wavefield and a down-going wavefield. In other words, the pressure wavefield P can be written as a combination of an up-going pressure wavefield $P^u$ and a down-going pressure wavefield $P^d$ as follows:

$$P = P^u + P^d \tag{3}$$

Similarly, the vertical velocity wavefield $V_z$ can be written as a combination of an up-going vertical velocity wavefield $V_z^u$ and a down-going vertical velocity wavefield $V_z^d$ as follows:

$$V_z = V_z^u + V_z^d \tag{4}$$

The up-going and down-going pressure wavefields and the up-going and down-going vertical velocity wavefields can be expressed as functions of the measured pressure wavefield P and the measured vertical velocity wavefield $V_z$ by introducing an amplitude scaling vector.

$$\frac{\rho c}{\cos\theta} = \frac{Z}{\cos\theta} \tag{5}$$

where ρ is the density of the fluid, c is speed of sound in the fluid, and Z is the acoustic impedance value. The up-going pressure wavefield is given by:

$$P^u = \frac{1}{2}\left(P - \frac{Z}{\cos\theta}V_z\right) \tag{6a}$$

and the down-going pressure wavefield is given by:

$$P^d = \frac{1}{2}\left(P + \frac{Z}{\cos\theta}V_z\right) \tag{6b}$$

Analogously, the up-gong vertical velocity wavefield is given by:

$$V_z^u = \frac{1}{2}\left(V_z - \frac{\cos\theta}{Z}P\right) \quad (6c)$$

and the down-going vertical velocity wavefield is given by:

$$V_z^d = \frac{1}{2}\left(V_z + \frac{\cos\theta}{Z}P\right) \quad (6d)$$

The up-going and down-going pressure and velocity wavefields represented in Equations (6) can be rewritten in terms of the measured horizontal velocity wavefield components $V_x$ and $V_y$ in order to avoid determination of the incidence angle $\theta$ as follows. Because the vertical velocity wavefield $V_z$ is a component of the velocity wavefield vector $\vec{V}$, the magnitude of the vertical velocity wavefield is given by:

$$|V_z| = \|\vec{V}\| \cos\theta \quad (7)$$

where $|\cdot|$ is the absolute value or modulus of a complex number, and $$\|\vec{V}\| = \sqrt{V_x^2 + V_y^2 + V_z^2} \quad (8)$$

where $\|\cdot\|$ represents the magnitude, or norm, of a vector. Because the velocities $V_x$, $V_y$, and $V_z$ are known, the angle-dependent scaling factor given in Equation (5) can be rewritten using Equations (7) and (8) as:

$$\frac{Z}{\cos\theta} = Z\frac{\|\vec{V}\|}{|V_z|} \quad (9)$$

Substituting the scaling factor given by Equations (9) and (10) into Equations (6) gives:

$$P^u = \frac{1}{2}\left(P - \frac{Z\|\vec{V}\|}{|V_z|}V_z\right) \quad (11a)$$

$$P^d = \frac{1}{2}\left(P + \frac{Z\|\vec{V}\|}{|V_z|}V_z\right) \quad (11b)$$

$$V_z^u = \frac{1}{2}\left(V_z - \frac{|V_z|}{Z\|\vec{V}\|}P\right) \quad (11c)$$

and, $$V_z^d = \frac{1}{2}\left(V_z + \frac{|V_z|}{Z\|\vec{V}\|}P\right) \quad (11d)$$

By expressing the scaling factor as a function of the horizontal and vertical velocities, the wavefield separation may be performed locally and independent of information from neighboring traces.

The scaling factor can be further reduced to a function of solely the horizontal velocity wavefields $V_x$ and $V_y$ and the pressure wavefield P using principles of ray theory. After the vertical velocity wavefield has been eliminated from the scaling factor, wavefield separation is not compromised by the overlap between up-going and down-going wavefield signals up to the highest incidence angles The slowness vector, $\vec{p}$, is a vector directed, in isotropic media, perpendicular to the wavefront of a wavefield and is represented by:

$$\vec{p} = (p_x, p_y, p_z) \quad (12)$$

where the components of the slowness vector are related to the components of the velocity wavefields as follows:

$$p_x = \frac{\rho|V_x|}{|P|} = \frac{\rho|V_x|}{|P^u + P^d|} \quad (13a)$$

$$p_y = \frac{\rho|V_y|}{|P|} = \frac{\rho|V_y|}{|P^u + P^d|} \quad (13b)$$

and $$p_z = \frac{\rho|V_z|}{|P^u - P^d|} \quad (13c)$$

Figure 10:
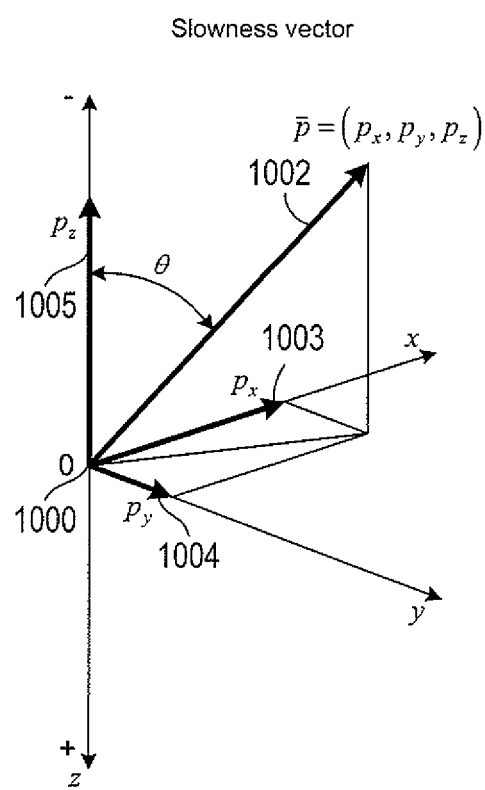
FIG. 10 shows a Cartesian coordinate system associated with an example slowness vector.

FIG. 10 shows a Cartesian coordinate system with the origin 1000 centered at three motion sensors of a receiver (not shown). The slowness vector 1002 components $p_x(x_r, y_r, z_r, t)$ 1003, $p_y(x_r, y_r, z_r, t)$ 1004, and $p_z(x_r, y_r, z_r, t)$ 1005 are directed along x-, y-, and z-coordinate axes. The slowness vector $\vec{p}$ has the same polar angle $\theta$ with respect to the z-axis as the velocity vector V has with the z-axis shown in FIG. 8.

The magnitude of the slowness vector is $$\|\vec{p}\| = \sqrt{p_x^2 + p_y^2 + p_z^2} = \frac{1}{c} \quad (14)$$

Using Equations (13a), (13b) and (14), the component of the slowness vector in the z-direction, $p_z$, can be rewritten as a function of the x- and y-horizontal velocity wavefields and the pressure wavefield as follows:

$$p_z = \sqrt{\frac{1}{c^2} - \frac{\rho^2|V_x|^2}{|P|^2} - \frac{\rho^2|V_y|^2}{|P|^2}} \quad (15)$$

Multiplying the slowness vector $\vec{p}$ by c gives the unit slowness vector, $\hat{p} = c\vec{p}$, with components:

$$\hat{p}_x = \frac{Z|V_x|}{|P|} = \frac{Z|V_x|}{|P^u + P^d|} \quad (16a)$$

$$\hat{p}_y = \frac{Z|V_y|}{|P|} = \frac{Z|V_y|}{|P^u + P^d|} \quad (16b)$$

and $$\hat{p}_z = \frac{Z|V_z|}{|P^u + P^d|} \quad (16c)$$

The cosine of the polar angle $\theta$ between the unit slowness vector $\hat{p}$ and the z-component $\hat{p}_z$ is:

$$\cos\theta = \frac{|\hat{p}_z|}{\|\hat{p}\|} = \sqrt{1 - \hat{p}_x^2 - \hat{p}_y^2} = \sqrt{1 - \frac{Z^2|V_x|^2}{|P|^2} - \frac{Z^2|V_y|^2}{|P|^2}} \quad (17)$$

Substituting Equation (17) into the scaling factor of Equation (5) gives a scaling factor that depends only on the horizontal velocity wavefields $V_x$ and $V_y$ and the pressure wavefield P:

$$\frac{Z}{\cos\theta} = \frac{Z}{\sqrt{1 - \frac{Z^2|V_x|^2}{|P|^2} - \frac{Z^2|V_y|^2}{|P|^2}}} \quad (18)$$

Substituting the scaling factor given by Equation (18) into Equations (6) gives up-going and down-going wavefields:

$$P^u = \frac{1}{2}\left(P - \frac{Z}{\sqrt{1 - \frac{Z^2|V_x|^2}{|P|^2} - \frac{Z^2|V_y|^2}{|P|^2}}} V_z\right) \quad (19a)$$

$$P^d = \frac{1}{2}\left(P + \frac{Z}{\sqrt{1 - \frac{Z^2|V_x|^2}{|P|^2} - \frac{Z^2|V_y|^2}{|P|^2}}} V_z\right) \quad (19b)$$

$$V_z^u = \frac{1}{2}\left(V_z - \frac{\sqrt{1 - \frac{Z^2|V_x|^2}{|P|^2} - \frac{Z^2|V_y|^2}{|P|^2}}}{Z} P\right) \quad (19a)$$

and, $$V_z^d = \frac{1}{2}\left(V_z + \frac{\sqrt{1 - \frac{Z^2|V_x|^2}{|P|^2} - \frac{Z^2|V_y|^2}{|P|^2}}}{Z} P\right) \quad (19b)$$

The wavefields in Equations (19) are computed for all angles locally in the space-time domain without using information from neighboring traces. The result of this single trace approach is that wavefield separation is not influenced by spatial sampling and wavefield separation is not affected by spatial aliasing.

Using the local slowness vector and the position vector, the signals of a trace can be extrapolated beyond spatial aliasing. For example, by ray tracing either upwards or downward from an initial position at a separation level to a final position at an arbitrary depth level the signals of a trace can be extrapolated beyond aliasing. The up-going wavefield is extrapolated upwards forward in time and downwards backward in time. On the other hand, the signals of a down-going wavefield are extrapolated upwards backward in time and downwards forward in time. For example, a delay time, $\Delta t$, along a ray between an initial position of a channel $\vec{x}$ and a final extrapolation position $\vec{x} + \Delta \vec{x}$ can be calculated in homogeneous media by:

$$\Delta t = \frac{\rho|V_x|}{|P|}\Delta x + \frac{\rho|V_y|}{|P|}\Delta y + \sqrt{\frac{1}{c^2} - \frac{\rho^2|V_x|^2}{|P|^2} - \frac{\rho^2|V_y|^2}{|P|^2}} \Delta z \quad (20)$$

where the slowness vector components have been expressed by the horizontal velocity wavefield components given by Equations (13a), (13b), and (15).

In another embodiment, the wavefield separation can be performed in the wavenumber-frequency domain by applying a transform, such as a Fourier transform, to the measured velocity wavefields $V_x$, $V_y$, and $V_z$ and the pressure wavefield P prior to insertion into equations for the up-going and down-going wavefields presented above in Equations (19). For example, the measured velocity wavefields $V_x$, $V_y$, and $V_z$ and the pressure wavefield P can be transformed using a Fourier transform:

$$V_x(x_r, y_r, z_r, t) \xrightarrow{FT} \tilde{V}_x(k_x, k_y, z_r, \omega), \quad (21)$$

$$V_y(x_r, y_r, z_r, t) \xrightarrow{FT} \tilde{V}_y(k_x, k_y, z_r, \omega),$$

$$V_z(x_r, y_r, z_r, t) \xrightarrow{FT} \tilde{V}_z(k_x, k_y, z_r, \omega), \text{ and}$$

$$P(x_r, y_r, z_r, t) \xrightarrow{FT} \tilde{P}(k_x, k_y, z_r, \omega)$$

where "~" represents quantities in the wavenumber-frequency domain, $\omega = 2\pi f$ is the angular frequency for frequency f, and $k_x$ and $k_y$ are wavenumbers in the x- and y-directions, respectively. In practice, the Fourier transform can be executed as a discrete Fast Fourier transform ("DFFT") for speed and computational efficiency. The vertical slowness in the wavenumber-frequency domain is given by:

$$\tilde{p}_z = \sqrt{\frac{1}{c^2} - \frac{\rho^2|\tilde{V}_x|^2}{|\tilde{P}|^2} - \frac{\rho^2|\tilde{V}_y|^2}{|\tilde{P}|^2}} \quad (22)$$

The calculation of up-going and down-going wavefields using the transformed measured velocity wavefields $\tilde{V}_x$, $\tilde{V}_y$, and $\tilde{V}_z$ and the pressure wavefield $\tilde{P}$ in the wavenumber-frequency domain is given by:

$$\tilde{P}^u = \frac{1}{2}\left(\tilde{P} - \frac{Z}{\sqrt{1 - \frac{Z^2|\tilde{V}_x|^2}{|\tilde{P}|^2} - \frac{Z^2|\tilde{V}_y|^2}{|\tilde{P}|^2}}} \tilde{V}_z\right) \quad (23a)$$

$$\tilde{P}^d = \frac{1}{2}\left(\tilde{P} + \frac{Z}{\sqrt{1 - \frac{Z^2|\tilde{V}_x|^2}{|\tilde{P}|^2} - \frac{Z^2|\tilde{V}_y|^2}{|\tilde{P}|^2}}} \tilde{V}_z\right) \quad (23b)$$

$$\tilde{V}_z^u = \frac{1}{2}\left(\tilde{V}_z - \frac{\sqrt{1 - \frac{Z^2|\tilde{V}_x|^2}{|\tilde{P}|^2} - \frac{Z^2|\tilde{V}_y|^2}{|\tilde{P}|^2}}}{Z} \tilde{P}\right) \quad (23c)$$

and, $$\tilde{V}_z^d = \frac{1}{2}\left(\tilde{V}_z + \frac{\sqrt{1 - \frac{Z^2|\tilde{V}_x|^2}{|\tilde{P}|^2} - \frac{Z^2|\tilde{V}_y|^2}{|\tilde{P}|^2}}}{Z} \tilde{P}\right) \quad (23d)$$

The up-going and down-going wavefields computed in Equations (23) in the plane-wave domain can also be derived in a similar approach by starting with the Helmholtz equation and by following the rules of wave propagation. However, the approach presented in Equations (23) uses the amplitude ratios (i.e., spectral ratios) of the horizontal velocity wavefields and the pressure wavefield for scaling in contrast to other techniques, where the frequency and wavenumber values are directly used from the frequency-wavenumber domain. Because the spectral ratios in Equations (23) are not affected by aliasing, the separation method described above works accurately beyond aliasing.

The original up-going and down-going wavefields in the space-time domain can be recovered by applying an inverse transform to the up-going and down-going wavefields in the wavenumber-frequency domain:

$$\tilde{P}^u(k_x, k_y, z_r, \omega) \xrightarrow{IFT} P^u(x_r, y_r, z_r, t),$$

$$\tilde{P}^d(k_x, k_y, z_r, \omega) \xrightarrow{IFT} P^d(x_r, y_r, z_r, t),$$

$$\tilde{V}_z^u(k_x, k_y, z_r, \omega) \xrightarrow{IFT} V_z^u(x_r, y_r, z_r, t), \text{ and}$$

$$\tilde{V}_z^d(k_x, k_y, z_r, \omega) \xrightarrow{IFT} V_z^d(x_r, y_r, z_r, t)$$

(24)

In practice, the inverse transformation can be executed using a discrete inverse fast Fourier transform for speed and computational efficiency.

Wavefield principles can also be used with wavefield extrapolation in the wavenumber-frequency domain. A detailed description including a synthetic data example is presented below.

An Example Computational Method and System for Avoiding Spatial Aliasing in Extrapolating Wavefields In the wavenumber-frequency domain, the up-going and down-going wavefields can be extrapolated in the positive z-direction (i.e., downward) using an extrapolator given by:

$$\tilde{U}(k_x, k_y, z+\Delta z, \omega) = \tilde{U}(k_x, k_y, z, \omega) e^{i\omega \tilde{p}_z \Delta z} \quad (25a)$$

$$\tilde{D}(k_x, k_y, z+\Delta z, \omega) = \tilde{D}(k_x, k_y, z, \omega) e^{i\omega \tilde{p}_z \Delta z} \quad (25b)$$

where $\tilde{U}$ represents the up-going wavefields $\tilde{P}^u$ and $\tilde{V}_z^u$, and $\tilde{D}$ represents the down-going wavefields $\tilde{P}^d$ and $\tilde{V}_z^d$ in the wavenumber-frequency domain, and $\Delta z$ represents the extrapolation step size. On the other hand, the wavefield can be extrapolated in the negative z-direction (i.e., upward) using an extrapolator given by:

$$\tilde{U}(k_x, k_y, z-\Delta z, \omega) = \tilde{U}(k_x, k_y, z, \omega) e^{i\omega \tilde{p}_z \Delta z} \quad (26a)$$

$$\tilde{D}(k_x, k_y, z-\Delta z, \omega) = \tilde{D}(k_x, k_y, z, \omega) e^{i\omega \tilde{p}_z \Delta z} \quad (26b)$$

Figure 11:
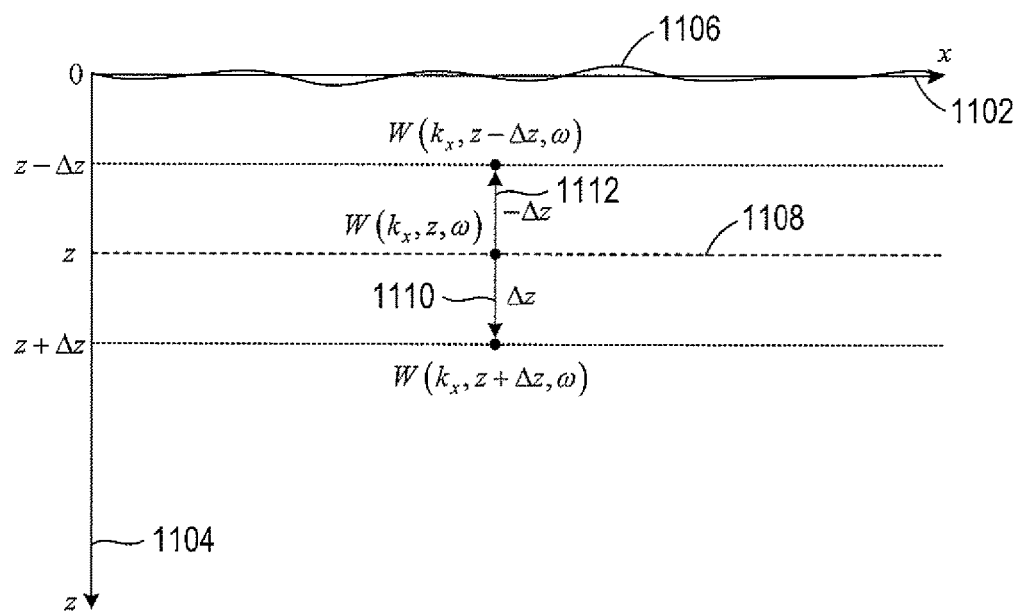
FIG. 11 shows an example representation of wavefield extrapolation from a depth below a free surface.

FIG. 11 shows an xz-plane example representation of wavefield extrapolation from a depth z below a free surface, where W represents the up-going or down-going wavefield. Directional arrow 1102 represents the x-axis, directional arrow 1104 represents the z-axis, and curve 1106 represents the free surface. By convention, dashed line 1108 represents a depth of z below the free surface 1106. When the exponent of the exponential term is positive (i.e., $\Delta z > 0$), an up-going wavefield is extrapolated downward toward to larger z-values (i.e., $z+\Delta z$) as indicated by directional arrow 1110. On the other hand, when the exponent of the exponential term is negative (i.e., $\Delta z > 0$), the wavefield is extrapolated upward toward smaller z-values (i.e., $z-\Delta z$) as indicated by directional arrow 1112. Note that for extrapolation of a down-going wavefield using Equations (25b) and (26b), the signs of the exponent in the exponential term are opposite.

Equations (25) present wavefield extrapolation as multiplying the wavefield in the wavenumber-frequency domain by exponentials that are functions of the vertical component of the slowness vector, $\tilde{p}_z$. From Equation (14), the vertical component of the slowness vector in the frequency domain can be written as a function of the horizontal slowness vector components as follows:

$$\tilde{p}_z = \sqrt{\frac{1}{c^2} - \tilde{p}_x^2 - \tilde{p}_y^2} \quad (27)$$

The vertical component is related to the vertical wavenumber $k_z$ as follows:

$$\omega \tilde{p}_z = \omega \sqrt{\frac{1}{c^2} - \tilde{p}_x^2 - \tilde{p}_y^2}$$

$$= \omega \sqrt{\frac{1}{c^2} - \frac{k_x^2}{\omega^2} - \frac{k_y^2}{\omega^2}} = k_z \quad (28)$$

As explained above in the subsection Spatial Aliasing, aliasing can be avoided the in-line and cross-line directions when the receivers are spaced so that $k_x < k_N$ and $k_y < k_N$. However, in practice, the wavefield can be sampled with widely spaced receivers, such as in the cross-line direction of a data acquisition surface.

Figure 12:
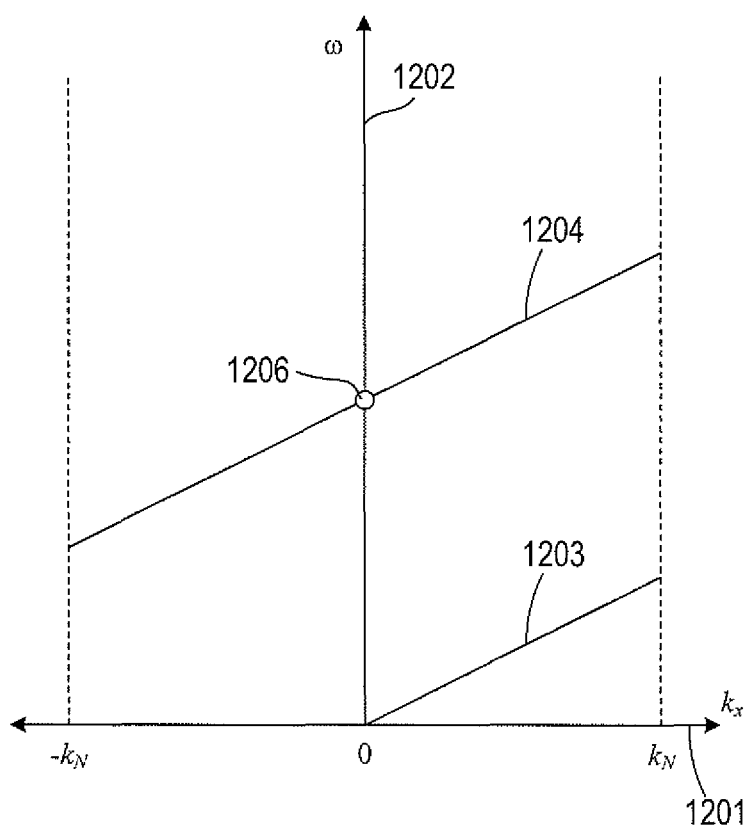
FIG. 12 shows an example plot of angular frequency versus horizontal wavenumber.

FIG. 12 shows an example plot of the angular frequency $\omega$ as a function of the horizontal wavenumber $k_x$. Directional arrow 1201 is the horizontal wavenumber $k_x$ axis, and directional arrow 1202 is the angular frequency $\omega$ axis. Line 1203 represents alias-free plane wave contributions to the angular frequency $\omega$ as a function of the horizontal wavenumber $k_x$. Alias-free plane waves have an angular frequency $\omega$ equal to zero when the associated wavenumber $k_x$ is zero. By contrast, line 1204 represents aliased plane wave contributions to the angular frequency $\omega$ as a function of the horizontal wavenumber $k_x$. Point 1206 represents a plane wave with $k_x=0$ and a non-zero angular frequency. Points along the line 1204, such as point 1206, represent plane waves associated with spatial aliasing and are incorrectly mapped, or folded back, from wavenumbers $k_x > k_N$. As a result, extrapolation of a wavefield using Equations (25)-(28) is disrupted when the wavefields is spatial aliased in at least one of the horizontal directions. For example, calculating $\tilde{p}_x = k_x/\omega$ with wavenumbers and angular frequencies located along the line 1204 results in an incorrect small value for $\tilde{p}_x$, which, in turn, incorrectly increases the size of the vertical component of the slowness vector $\tilde{p}_z$. A similar argument applies to the other horizontal wavenumber $k_y$, which likewise results in a small $\tilde{p}_y$. In other words, when measurements of the wavefield are spatially aliased, wavefield extrapolation in the wavenumber-frequency domain using the extrapolator given by Equations (25)-(28) cannot be relied on. For example, the extrapolator given by Equations (25)-(28) cannot be used to calculate an accurate image a subterranean formation, because the calculated vertical component $\tilde{p}_z$ is disrupted by spatial aliasing associated with one or both of the horizontal components $\tilde{p}_x$ and $\tilde{p}_y$.

In order to avoid the complications of spatial aliasing when extrapolating the wavefield, the horizontal slowness vector components can be calculated from the measured horizontal velocity wavefields and the measure pressure wavefields as follows:

$$\tilde{p}_x = \frac{\rho |\tilde{V}_x(k_x, k_y, z, \omega)|}{|\tilde{P}(k_x, k_y, z, \omega)|} \quad (29a)$$

and $$\tilde{p}_y = \frac{\rho |\tilde{V}_y(k_x, k_y, z, \omega)|}{|\tilde{P}(k_x, k_y, z, \omega)|} \quad (29b)$$

The amplitude ratios (i.e., spectral ratios) of the horizontal velocity wavefields and the pressure wavefield can be calculated from the equation of motion:

$$\frac{\rho|\tilde{V}_x|}{|\tilde{P}|} = \left|\frac{k_x}{\omega}\right| \text{ and } \frac{\rho|\tilde{V}_y|}{|\tilde{P}|} = \left|\frac{k_y}{\omega}\right|$$

The equations of motion are independent of position in the wavenumber-frequency domain for any values of the wavenumbers $k_x$ and $k_y$, and angular frequencies $\omega$. In other words, Equations (29) enable computation of the horizontal slowness vector components $\tilde{p}_x$ and $\tilde{p}_y$ without disruptions due to spatial aliasing. As a result, the up-going and down-going wavefields can be extrapolated in the positive and negative z-direction beyond aliasing using Equations (25) and (26), where the vertical component of the slowness vector is calculated by:

$$\tilde{p}_z = \sqrt{\frac{1}{c^2} - \frac{\rho^2|\tilde{V}_x(k_x, k_y, z, \omega)|^2}{|\tilde{P}(k_x, k_y, z, \omega)|^2} - \frac{\rho^2|\tilde{V}_y(k_x, k_y, z, \omega)|^2}{|\tilde{P}(k_x, k_y, z, \omega)|^2}} \quad (30)$$

Note that numerical stabilization may be used in calculations that involve wavefield amplitude ratios.

In the local (single trace) space-time domain approach, the up-going and down-going wavefields can be extrapolated in the positive z-direction by $\Delta z$ (i.e., downward) using an extrapolator given by:

$$U(x,y,z+\Delta z,t) = A_1 U(x,y,z,t) e^{i\omega \Delta t} \quad (31a)$$

$$D(x,y,z+\Delta z,t) = A_2 D(x,y,z,t) e^{-i\omega \Delta t} \quad (31b)$$

where U represents the up-going wavefields $p^u$ and $V_z^u$, and D represents the down-going wavefields $P^d$ and $V_z^d$ in the space-time domain, and $\Delta t$ represents the time delay from Equation (20). The wavefield can be extrapolated in the negative z-direction (i.e., upward) using an extrapolator given by:

$$U(x,y,z-\Delta z,t) = A_3 U(x,y,z,t) e^{i\omega \Delta t} \quad (32a)$$

$$D(x,y,z+\Delta z,t) = A_4 D(x,y,z,t) e^{i\omega \Delta t} \quad (32b)$$

The multiplicative factors $A_1$, $A_2$, $A_3$, and $A_4$ in Equations (31) and (32) are introduced to account for amplitude changes due to extrapolation. Because the horizontal slowness vector components $p_x$ and $p_y$ can be calculated from the measured horizontal velocity wavefields and the measured pressure wavefields, the computational complications due to spatial aliasing are avoided. Numerical stabilization may also be used in calculations that involve wavefield amplitude ratios in time domain.

Figure 13A:
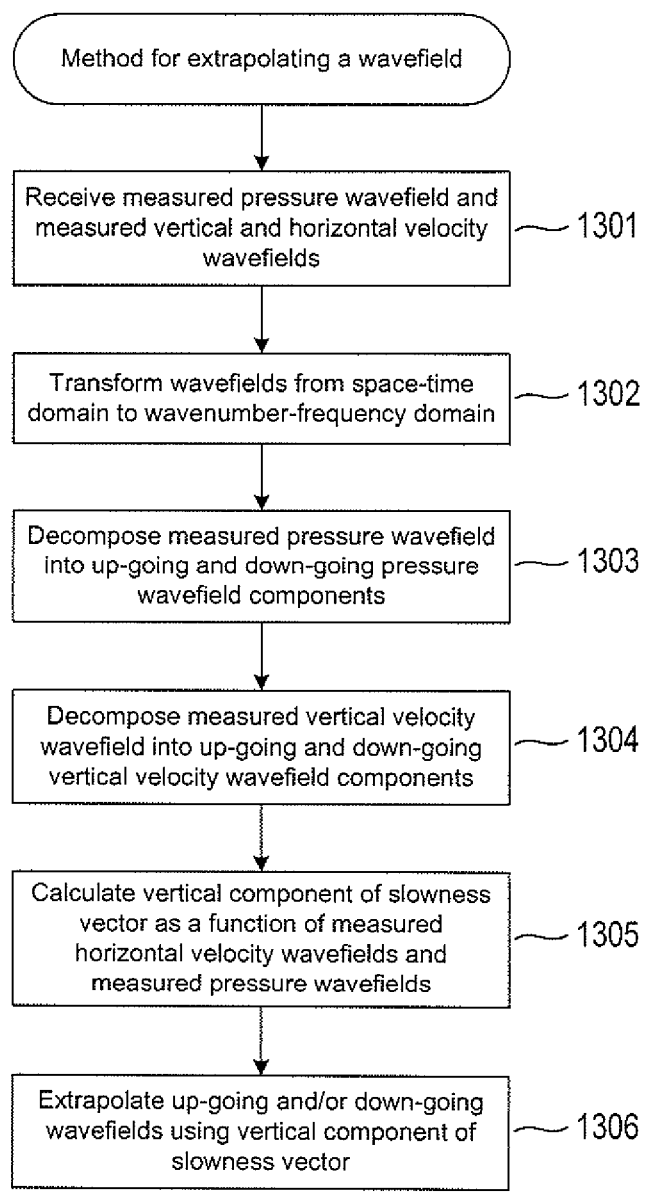
FIGS. 13A-13B show flow diagrams of two methods for extrapolating a wavefield.

FIG. 13A shows a flow diagram of a method for extrapolating a wavefield in the wavenumber-frequency domain. In block 1301 of FIG. 13A, measured pressure wavefield P and measured vector velocity wavefield $\vec{V}(V_x, V_y, V_z)$ data is received. The pressure wavefield can be obtained from pressure sensors that measure the total pressure wavefield in all directions, and the vector velocity wavefield components $V_x$, $V_y$, and $V_z$ can be obtained from separate motion sensors that measure the wavefields in the x-, y-, and z-directions, as described above with reference to FIG. 6. In block 1302, the pressure wavefield and velocity wavefields are transformed from the space-time domain to the wavenumber-frequency domain to obtain transformed wavefields $\tilde{P}$, $\tilde{V}_x$, $\tilde{V}_y$, and $\tilde{V}_z$. For example, the wavefields can be transformed from the space-time domain to the wavenumber-frequency domain using a fast Fourier transform for computational efficiency and speed, as described above with reference to Equation (21). In block 1303, the measured pressure wavefield is decomposed into up-going and down-going wavefields $\tilde{P}^u$ and $\tilde{P}^d$ according to Equations (23a-b). In block 1304, the measured vertical velocity wavefield is decomposed into the up-going and down-going vertical velocity wavefields $\tilde{V}^u$ and $\tilde{V}^d$ according to Equations (23c-d). Note that the order in which the operations of blocks 1303 and 1304 are executed is not limited to block 1303 being executed before execution of the operations of block 1304. Alternatively, the order of the operations in blocks 1303 and 1304 can be reversed or these operations can be performed in parallel. In block 1305, the vertical component of the slowness vector, $\tilde{p}_z$, is calculated as a function of the measured horizontal wavefields and the measured pressure wavefield, as described above with reference to Equation (30). In block 1306, an up-going or down-going pressure wavefield is extrapolated in the z-direction using Equations (25-26).

Figure 13B:
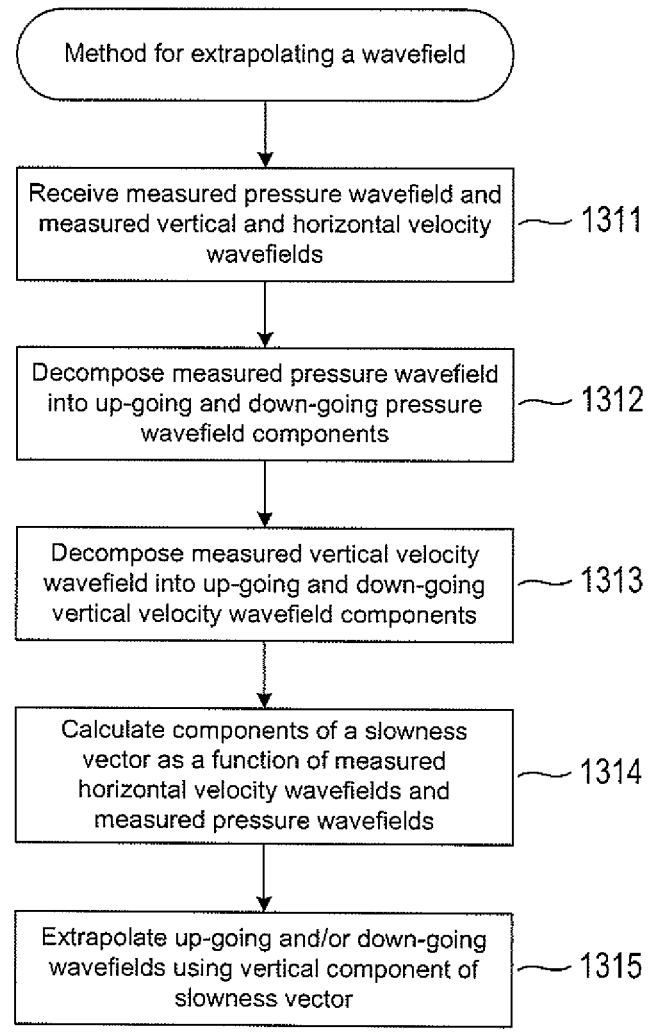

FIG. 13B shows a flow diagram of a method for extrapolating a wavefield locally in the time domain. In block 1311 of FIG. 13B, measured pressure wavefield P and measured vector velocity wavefield $\vec{V}(V_x, V_y, V_z)$ data is received. The pressure wavefield can be obtained from pressure sensors that measure the total pressure wavefield in all directions, and the vector velocity wavefield components $V_x$, $V_y$, and $V_z$ can be obtained from separate motion sensors that measure the wavefields in the x-, y-, and z-directions, as described above with reference to FIG. 6. In block 1312, the measured pressure wavefield is decomposed into up-going and down-going wavefields $P^u$ and $P^d$ according to Equations (19a-b). In block 1313, the measured vertical velocity wavefield is decomposed into the up-going and down-going vertical velocity wavefields $V^u$ and $V^d$ according to Equations (19c-d). Note that the order in which the operations of blocks 1312 and 1313 are executed is not limited to block 1312 being executed before execution of the operations of block 1313. Alternatively, the order of the operations in blocks 1312 and 1313 can be reversed or these operations can be performed in parallel. In block 1314, the vertical components of the slowness vector, $p_z$, $p_x$, and $p_y$ are calculated as functions of the measured horizontal velocity wavefields and the measured pressure wavefield, as described above with reference to Equations (15), (16a), and (16b). In block 1315, an up-going or down-going pressure wavefield is extrapolated in the z-direction using Equation (31)-(32).

Figure 14:
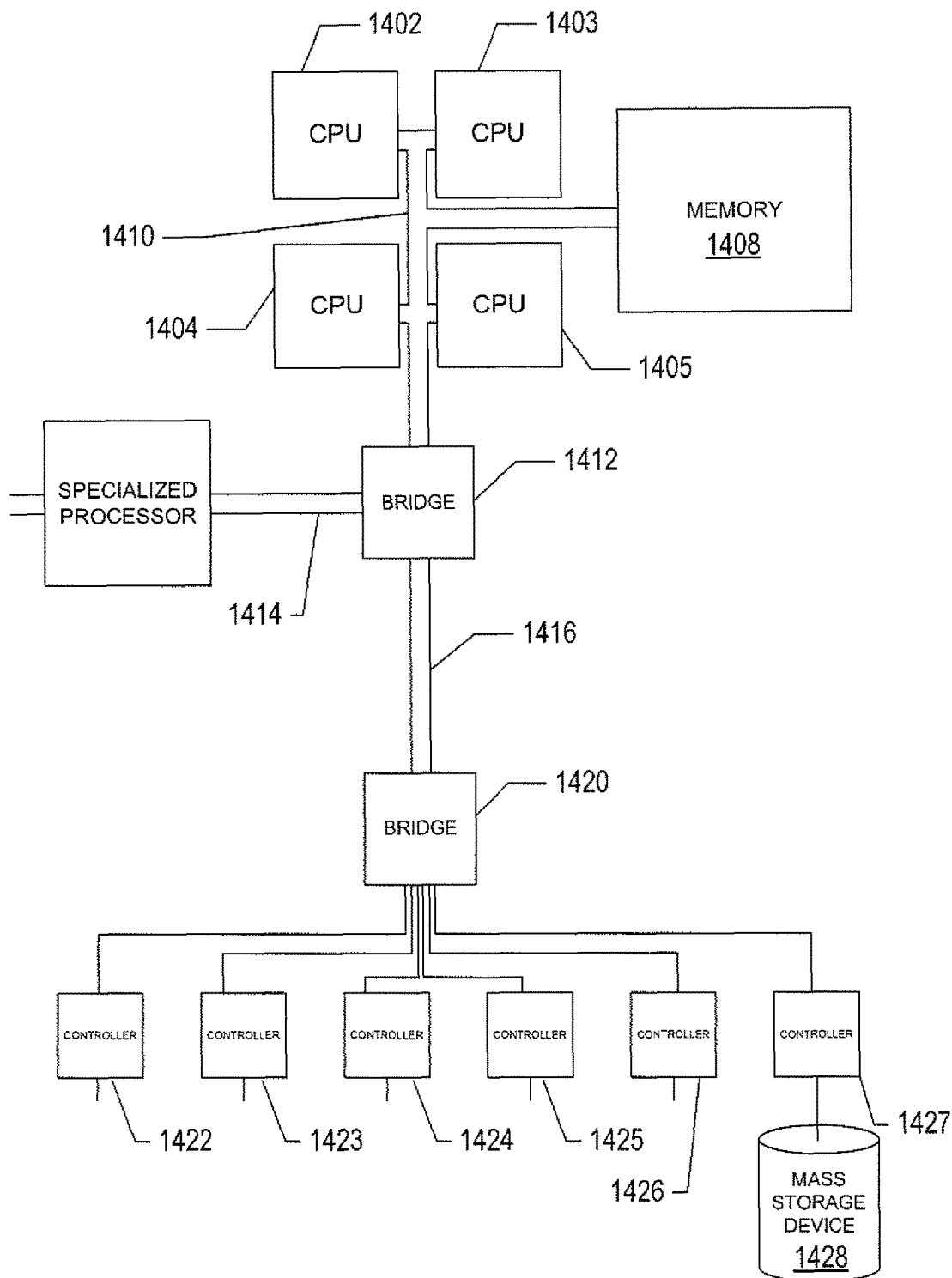
FIG. 14 shows an example of a generalized computer system.

FIG. 14 shows an example of a generalized computer system that executes an efficient method for extrapolating wavefields while bypassing spatial aliasing and therefore represents a seismic-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1402-1405, one or more electronic memories 1408 interconnected with the CPUs by a CPU/memory-subsystem bus 1410 or multiple busses, a first bridge 1412 that interconnects the CPU/memory-subsystem bus 1410 with additional busses 1414 and 1416, or other types of high-speed interconnection media, including multiple, high-speed serial interconnects. The busses or serial interconnections, in turn, connect the CPUs and memory with specialized processors, such as a graphics processor 1418, and with one or more additional bridges 1420, which are interconnected with high-speed serial links or with multiple controllers 1422-1427, such as controller 1427, that provide access to various different types of computer-readable media, such as computer-readable medium 1428, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1428 is a data-storage device, including electronic memory, optical or magnetic disk drive, USB drive, flash memory and other such data-storage device. The computer-readable medium 1428 can be used to store machine-readable instructions that encode the computational methods described above and can be used to store encoded data, during store operations, and from which encoded data can be retrieved, during read operations, by computer systems, data-storage systems, and peripheral devices.

Experimental Results

Figure 15A:
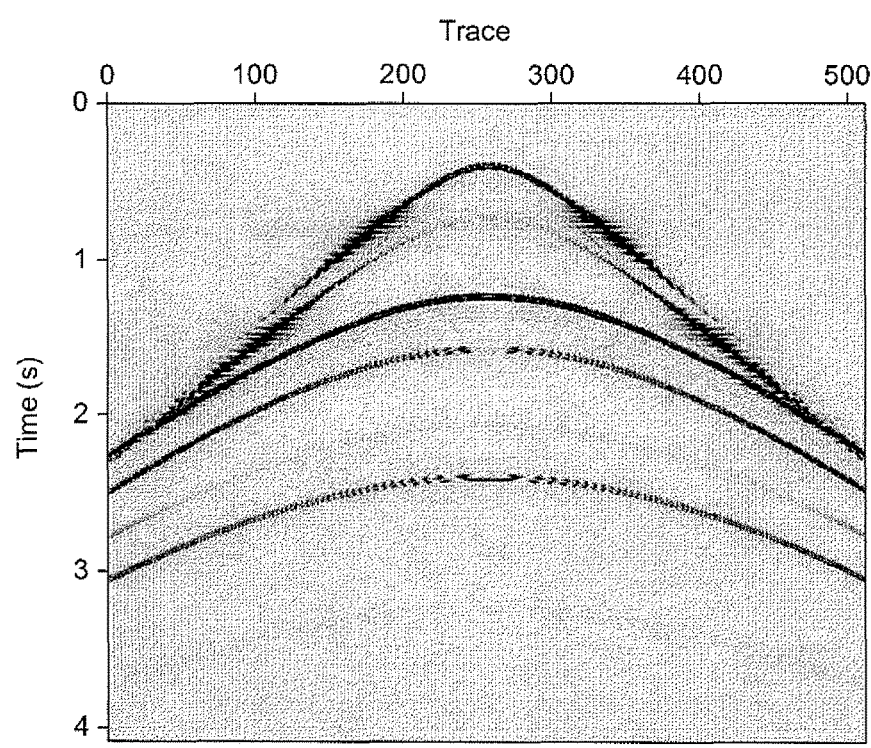
FIGS. 15A-15G show plots of modeled and calculated pressure wavefields versus time.
Figure 15B:
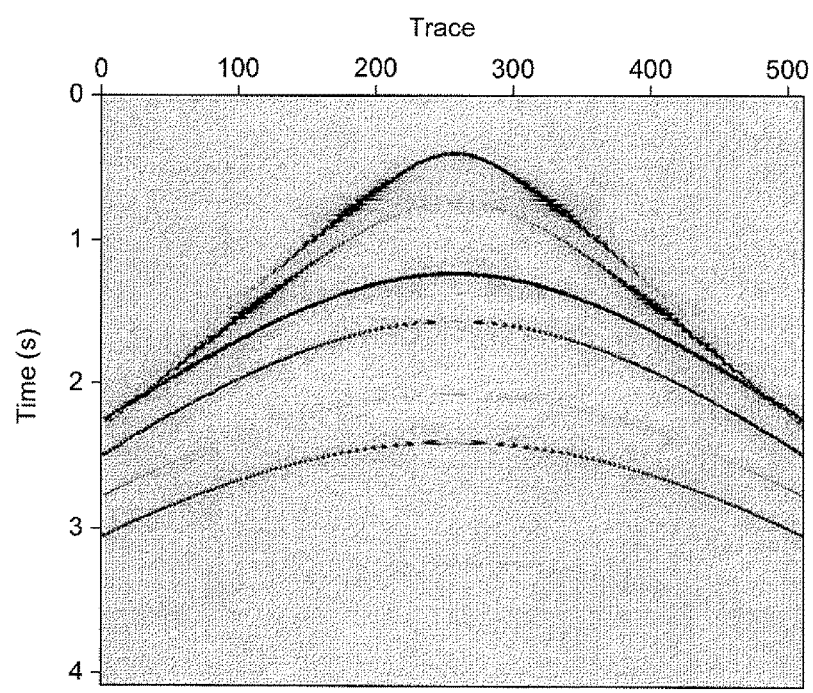
Figure 15C:
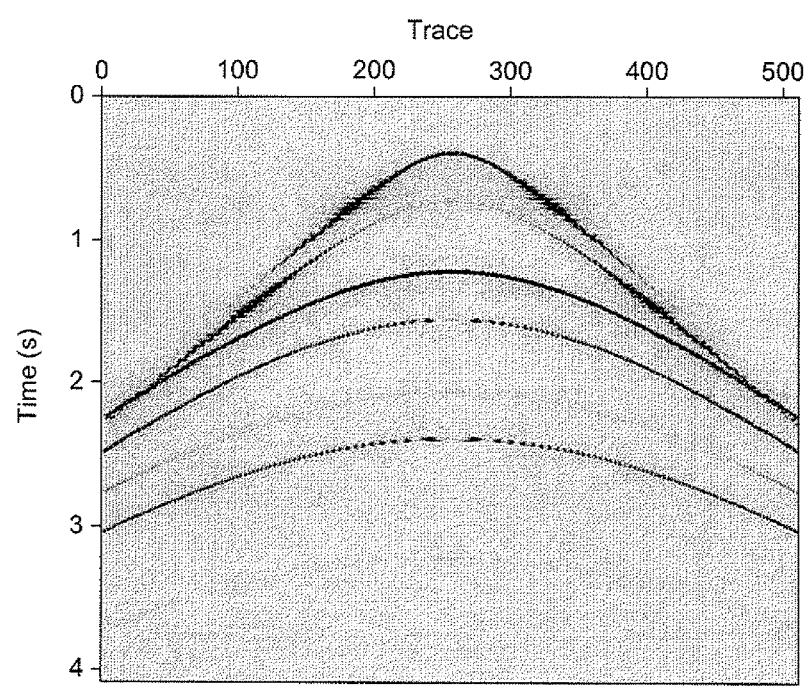
Figure 15D:
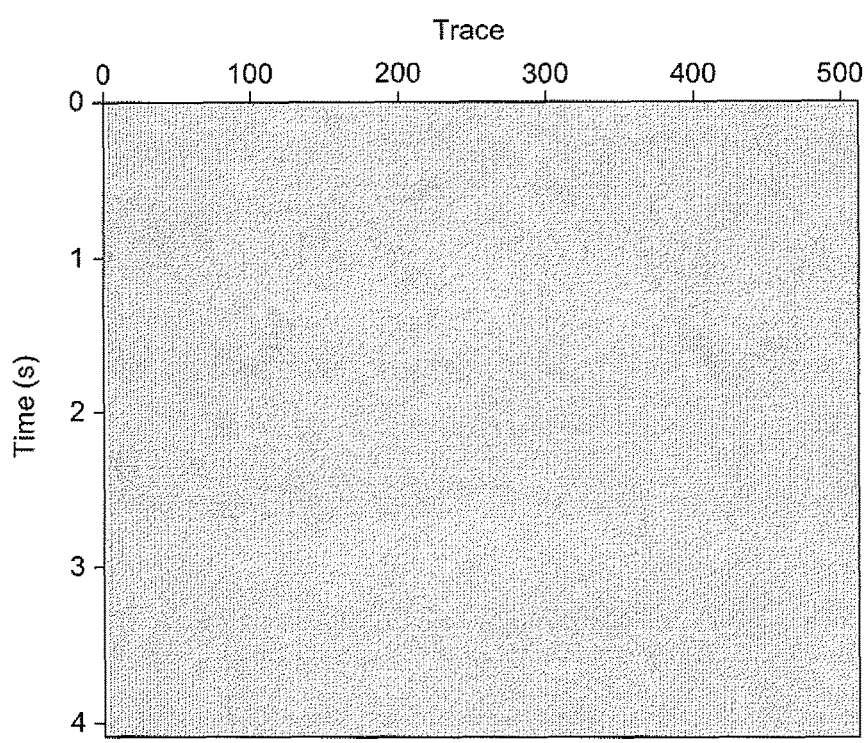
Figure 15E:
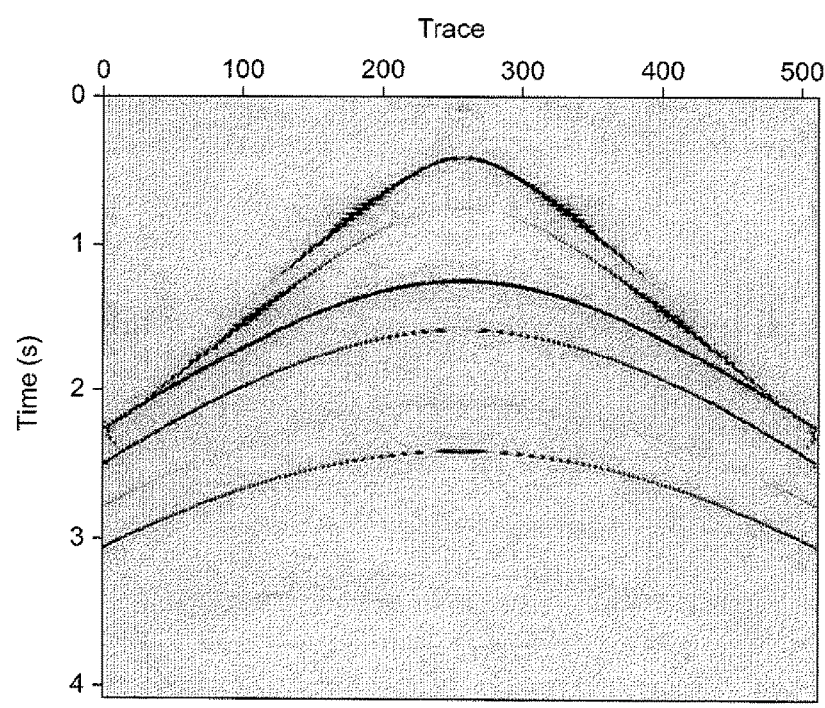
Figure 15F:
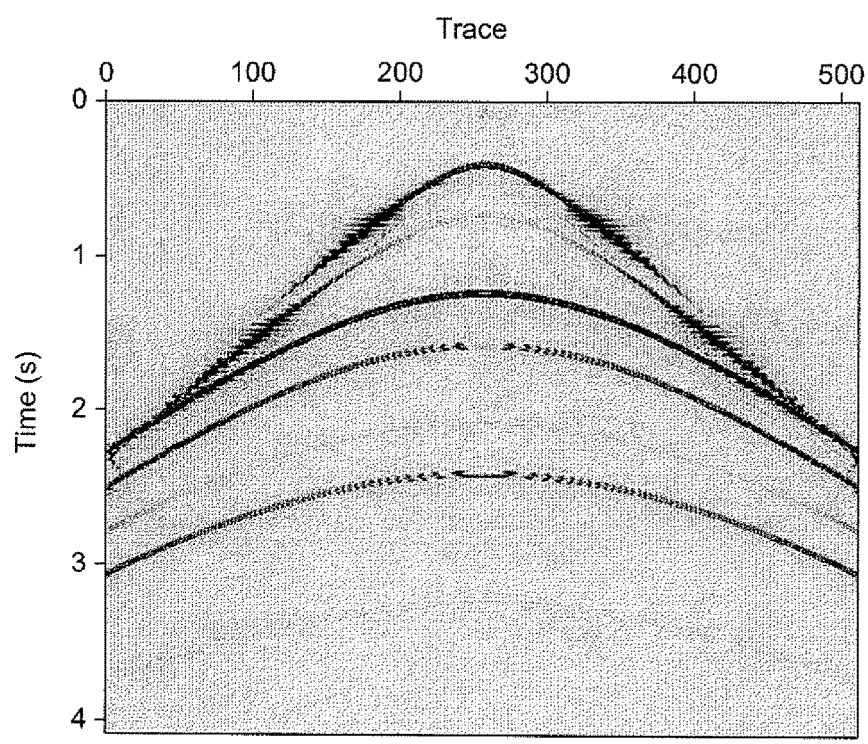
Figure 15G:
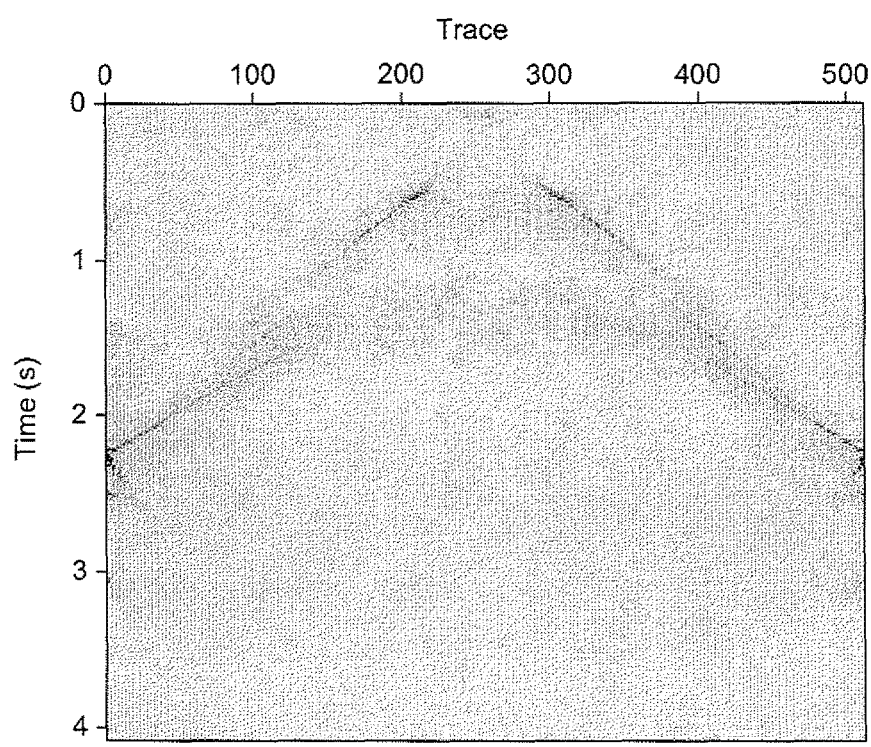

FIGS. 15A-15G show plots of modeled and calculated pressure wavefields versus time. FIG. 15A shows total pressure wavefield data that was generated using the reflectivity modeling method, which represents the data measured by a hydrophone. FIG. 15B shows the up-going pressure wavefield obtained from Equation (21a). FIG. 15C shows a modeled up-going pressure wavefield. FIG. 15D shows the difference between the calculated using the Equation (21a) and the ideal case presented in FIG. 15C. FIG. 15D reveals that the up-going pressure wavefield calculated from Equation (21a) is a very good approximation to the reflectivity modeled up-going pressure wavefield shown in FIG. 15C because much of FIG. 15D is blank. FIGS. 15E-15G show the effect of wavefield separation and extrapolation. FIG. 15E shows the up-going pressure wavefield represented in FIG. 15B after forward extrapolation by 15 meters upwards to the free surface, multiplication by −1 (the free surface reflection coefficient), and extrapolation downward to 15 meters again. The wavefield shown in FIG. 15E, resulting in a down-going wavefield at the receiver level that was added to the modeled (ideal) up-going wavefield shown in FIG. 15A to give the total pressure wavefield shown in FIG. 14F. FIG. 15G shows the error of separation and extrapolation that resulted from subtraction of wavefield shown in FIG. 15F from the modeled total pressure field shown in FIG. 15A.

Although the present invention has been described in terms of particular embodiments, the disclosure is not intended to be limited to these embodiments. For example, any number of different computational-processing-method implementations that carry out efficient wavefield extrapolation using horizontal slowness vector components that depend on measured horizontal velocity wavefields and measured pressured wavefields may be designed and developed using various different programming languages and computer platforms and by varying different implementation parameters, including control structures, variables, data structures, modular organization, and other such parameters. The computational representations of wavefields, operators, and other computational objects may be implemented in different ways.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation using marine seismic techniques in which a source generates an acoustic impulse in a body of water above the subterranean formation and pressure and velocity sensors located in the body of water measure pressure and velocity wavefields created in response to the acoustic impulse, the specific improvement comprising:
   receiving a measured pressure wavefield, a measured vertical velocity wavefield, and two measured horizontal velocity wavefields;
   decomposing one of the pressure wavefield and the vertical velocity wavefield into an up-going wavefield and a down-going wavefield;
   calculating components of a slowness vector from the speed of sound in a fluid, density of the fluid, the measured pressure wavefield, and the two horizontal velocity wavefields;
   extrapolating one of the up-going and down-going wavefields using an extrapolator that depends on the components of the slowness vector; and
   using one of the extrapolated up-going and down-going wavefields to generate an image of the subterranean formation, thereby reducing artifacts caused by spatial aliasing in the generated image.

2. The process of claim 1, wherein decomposing one of the pressure wavefield and the vertical velocity wavefield into an up-going wavefield and a down-going wavefield comprises:
   calculating a scaling factor from an acoustic impedance value, the measured pressure wavefield, and the two horizontal velocity wavefields; and
   calculating one of the up-going wavefield and the down-going wavefield from the measured pressure wavefield, the vertical velocity wavefield, and the scaling factor.

3. The process of claim 1, wherein decomposing one of the pressure wavefield and the vertical velocity wavefield into an up-going wavefield and a down-going wavefield comprises:
   calculating a scaling factor from an acoustic impedance value, the measured vertical velocity wavefield, and the two horizontal velocity wavefields; and
   calculating one of the up-going wavefield and the down-going wavefield from the measured pressure wavefield, the vertical velocity wavefield, and the scaling factor.

4. The process of claim 1, wherein the pressure wavefield and the velocity wavefields are obtained from receivers disposed on at least one of the following: one or more towed streamers, one or more ocean bottom cables, and one or more autonomous nodes.

5. The process of claim 1, further comprising transforming the measured pressure wavefield, the vertical velocity wavefield, and the horizontal velocity wavefield into a wavenumber-frequency domain.

6. The process of claim 1, wherein the extrapolator depends on an extrapolation position, inline and crossline components of the slowness vector, and a vertical component of the slowness vector when the measured pressure wavefield, the vertical velocity wavefield, and the horizontal velocity wavefield are in a space-time domain.

7. The process of claim 1, wherein the extrapolator depends on inline and crossline components of the slowness vector when the measured pressure wavefield, the vertical velocity wavefield, and the horizontal velocity wavefield are in a wavenumber-frequency domain.

8. The process of claim 1, wherein calculating the components of the slowness vector comprises:
    calculating an inline component of the slowness vector from the density of the fluid, measured pressure wavefield, and inline measured horizontal velocity wavefield;
    calculating a crossline component of the slowness vector from the density of the fluid, measured pressure wavefield, and crossline measured horizontal velocity wavefield; and
    calculating a vertical velocity component of the slowness vector from the speed of sound in the fluid, density of the fluid, and the inline and crossline components of the slowness vector, when at least one of the two measured horizontal velocity wavefields is spatially aliased.

9. At least one non-transitory computer-readable medium encoded with machine-readable instructions that, when executed by one or more processors of a computer system, cause the computer system to generate an image of a subterranean formation by performing operations comprising:
    from a dataset that is based on recordings made during a marine survey of a subterranean formation, accessing a pressure wavefield, a vertical velocity wavefield, and two horizontal velocity wavefields; and
    extrapolating one of an up-going and down-going wavefields using an extrapolator that depends on components of a slowness vector, wherein the extrapolating comprises:
        decomposing one of the pressure wavefield and the vertical velocity wavefield into the up-going wavefield and the down-going wavefield, and
        calculating the components of the slowness vector from the speed of sound in a fluid, a density of the fluid, the pressure wavefield, and the two horizontal velocity wavefields; and
    using one of the extrapolated up-going and down-going wavefields to generate the image of the subterranean formation.

10. The medium of claim 9, wherein decomposing one of the pressure wavefield and the vertical velocity wavefield into an up-going wavefield and a down-going wavefield comprises:
    calculating a scaling factor from an acoustic impedance value, the measured pressure wavefield, and the two horizontal velocity wavefields; and
    calculating one of the up-going wavefield and the down-going wavefield from the measured pressure wavefield, the vertical velocity wavefield, and the scaling factor.

11. The medium of claim 9, wherein decomposing one of the pressure wavefield and the vertical velocity wavefield into an up-going wavefield and a down-going wavefield comprises:
    calculating a scaling factor from an acoustic impedance value, the measured vertical velocity wavefield, and the two horizontal velocity wavefields; and
    calculating one of the up-going wavefield and the down-going wavefield from the measured pressure wavefield, the vertical velocity wavefield, and the scaling factor.

12. The medium of claim 9, wherein the pressure wavefield and the velocity wavefields are obtained from receivers disposed on at least one of the following: one or more towed streamers, one or more ocean bottom cables, and one or more autonomous nodes.

13. The medium of claim 9, further comprising transforming the measured pressure wavefield, the vertical velocity wavefield, and the horizontal velocity wavefield into a wavenumber-frequency domain.

14. The medium of claim 9, wherein the extrapolator depends on an extrapolation position, inline and crossline components of the slowness vector, and a vertical component of the slowness vector when the measured pressure wavefield, the vertical velocity wavefield, and the horizontal velocity wavefield are in a space-time domain.

15. The medium of claim 9, wherein the extrapolator depends on an inline component of the slowness vector and a crossline component of the slowness vector.

16. The medium of claim 9, wherein calculating the components of the slowness vector comprises:
    calculating an inline component of the slowness vector from the density of the fluid, measured pressure wavefield, and inline measured horizontal velocity wavefield;
    calculating a crossline component of the slowness vector from the density of the fluid, measured pressure wavefield, and crossline measured horizontal velocity wavefield; and
    calculating a vertical velocity component of the slowness vector from the speed of sound in the fluid, density of the fluid, and the inline and crossline components of the slowness vector, when at least one of the two measured horizontal velocity wavefields is spatially aliased.

17. The medium of claim 9, wherein the pressure wavefield, the vertical velocity wavefield, and the two horizontal velocity wavefields are measured with receivers located at different depths.

18. The medium of claim 9, wherein measuring a pressure wavefield, a vertical velocity wavefield, and two horizontal velocity wavefields comprises actuating a towed source and measuring the pressure wavefield, the vertical velocity wavefield, and the two horizontal velocity wavefields with towed receivers.

19. A computer system for generating an image of a subterranean formation from pressure and velocity wavefields recorded in a marine survey of the subterranean formation, the system comprising:
    one or more processors;
    one or more data-storage devices; and
    machine-readable instructions stored in one or more of the one or more data-storage devices and executed by the one or more processors to perform operations comprising:
        retrieving a measured pressure wavefield, a measured vertical velocity wavefield, and two measured horizontal velocity wavefields from the one or more data-storage devices;
        calculating components of a slowness vector from the speed of sound in a fluid, density of the fluid, the measured pressure wavefield, and the two horizontal velocity wavefields;
        extrapolating one of an up-going and down-going wavefields using an extrapolator that depends on the components of the slowness vector; and using one of the extrapolated up-going and down-going wavefields to generate the image of the subterranean formation.

20. The system of claim 19, further comprising:
calculating a scaling factor from an acoustic impedance value, the measured pressure wavefield, and the two horizontal velocity wavefields; and
calculating one of the up-going wavefield and the down-going wavefield from the measured pressure wavefield, the vertical velocity wavefield, and the scaling factor.

21. The system of claim 19, further comprising:
calculating a scaling factor from an acoustic impedance value, the measured vertical velocity wavefield, and the two horizontal velocity wavefields; and
calculating one of the up-going wavefield and the down-going wavefield from the measured pressure wavefield, the vertical velocity wavefield, and the scaling factor.

22. The system of claim 19, comprises transforming the measured pressure wavefield, the vertical velocity wavefield, and the horizontal velocity wavefield into a wavenumber-frequency domain.

23. The system of claim 19, wherein the extrapolator depends on an extrapolation position, inline and crossline components of the slowness vector, and a vertical component of the slowness vector when the measured pressure wavefield, the vertical velocity wavefield, and the horizontal velocity wavefield are in a space-time domain.

24. The system of claim 19, wherein the extrapolator depends on an inline component of the slowness vector and a crossline component of the slowness vector.

25. The system of claim 19, wherein calculating the components of the slowness vector comprises:
calculating an inline component of the slowness vector from the density of the fluid, measured pressure wavefield, and inline measured horizontal velocity wavefield;
calculating a crossline component of the slowness vector from the density of the fluid, measured pressure wavefield, and crossline measured horizontal velocity wavefield; and
calculating a vertical velocity component of the slowness vector from the speed of sound in the fluid, density of the fluid, and the inline and crossline components of the slowness vector, when at least one of the two measured horizontal velocity wavefields is spatially aliased.

* * * * *